May 12, 1970

J. E. JONES ETAL 3,512,137

CORRELATED RECORDING, REPRODUCING, PRINTING, AND
COMPOSING APPARATUS

Filed March 14, 1967

INVENTORS.
JOHN E. JONES
ROBERT A. KOLPEK
ROBERT A. RAHENKAMP

BY D. Kendall Cooper
ATTORNEY

FIG. 2
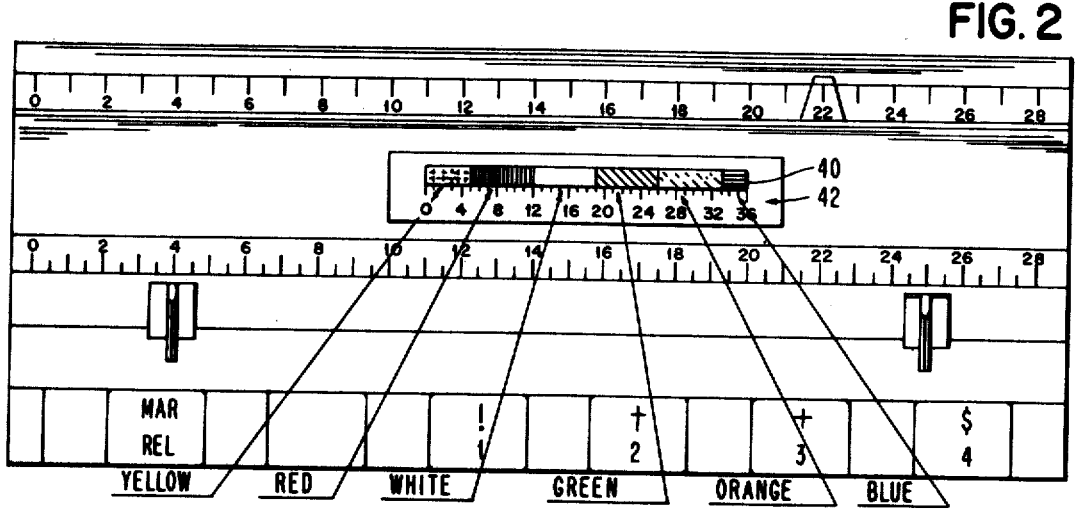
FIG. 3
| 9 UNITS | 8 UNITS | 7 UNITS | 6 UNITS | 5 UNITS | 4 UNITS | 3 UNITS |
|---|---|---|---|---|---|---|
| YELLOW | RED | WHITE | GREEN | ORANGE | BLUE | BLACK |
LINE REPRESENTS RIGHT HAND MARGIN
FIG. 4
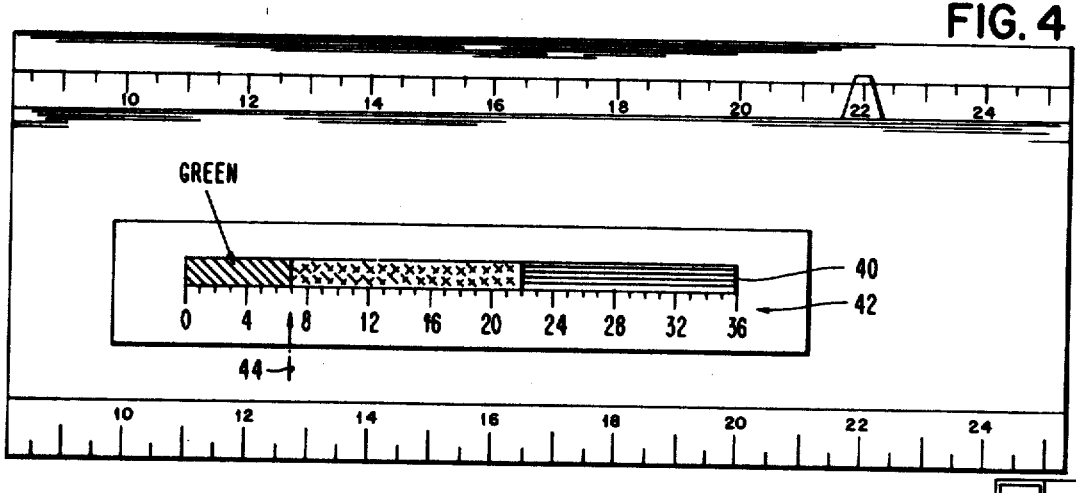
FIG. 5
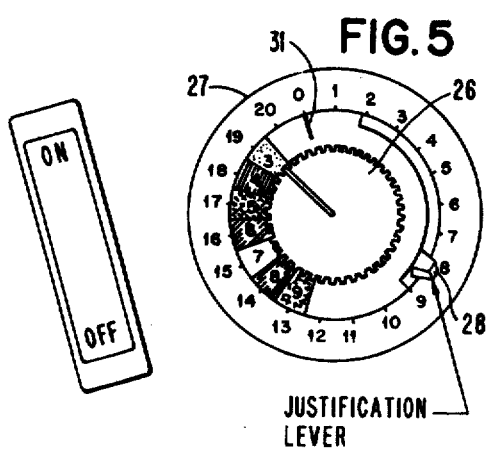
JUSTIFICATION LEVER
FIG. 6
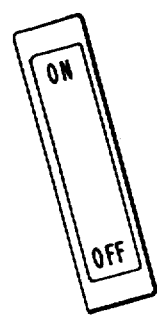
SPACEBAR QUANTITY DIAL
SPACEBAR VALUE DIAL

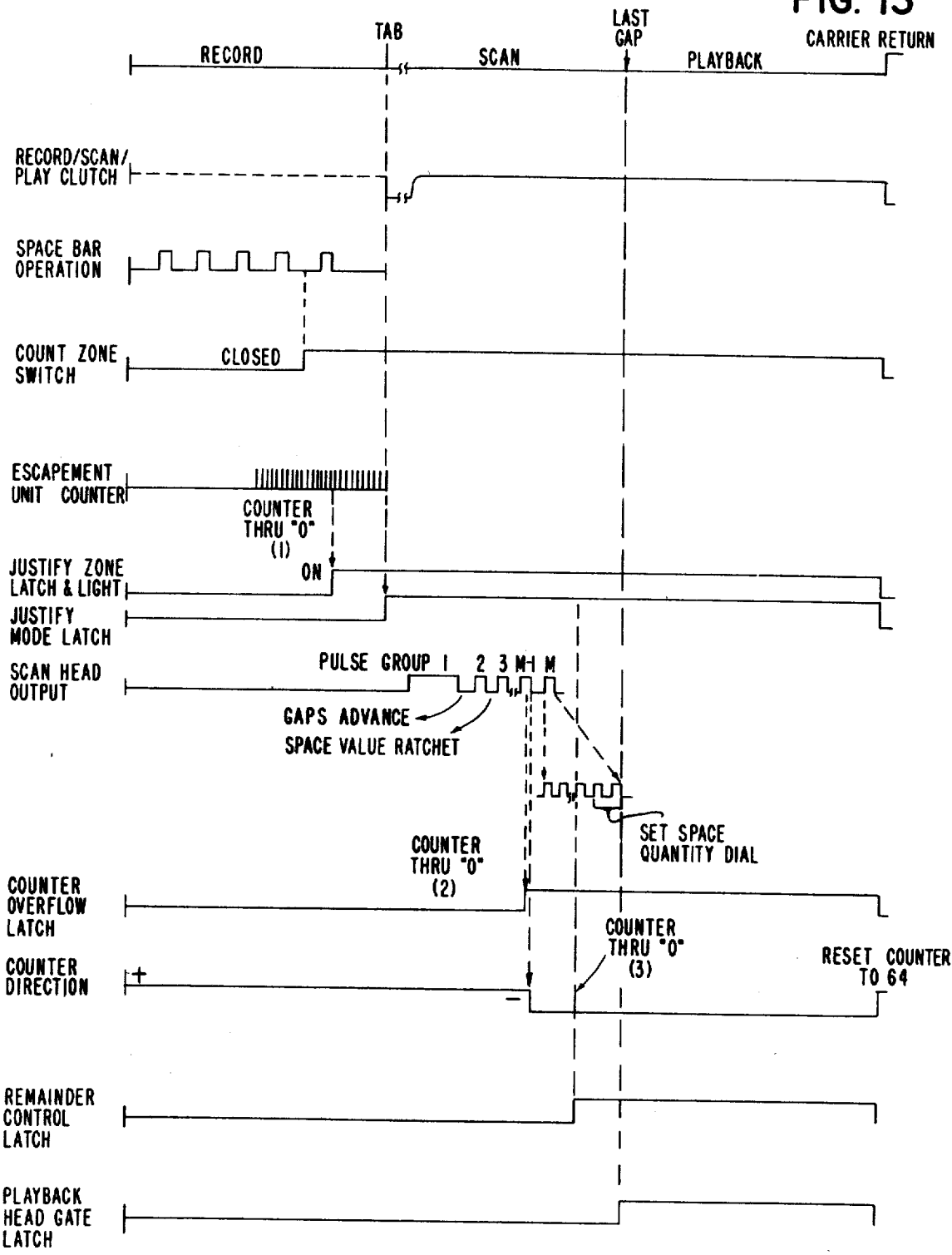

United States Patent Office 3,512,137
Patented May 12, 1970

3,512,137
CORRELATED RECORDING, REPRODUCING,
PRINTING, AND COMPOSING APPARATUS
John E. Jones, Robert A. Kolpek, and Robert A. Rahenkamp, Lexington, Ky., assignors to International Business Machines Corporation, Armonk, N.Y., a corporation of New York
Filed Mar. 14, 1967, Ser. No. 623,022
Int. Cl. G06f 5/00; G11b 11/00
U.S. Cl. 340—172.5                                49 Claims

ABSTRACT OF THE DISCLOSURE

The apparatus includes a printing composer interconnected with a record media processing device wherein lines of information printed on a document are correlated with a plurality of storage tracks on a media. In addition, the system includes means for producing justified printed copy from rough copy data. The media is shown in one case as a magnetic belt, and in another case as a magnetic card. In one mode, the system is responsive to rough copy data signals from the composer, representative of individual lines of information, to record the signals associated with an individual line in a particular storage track on the media. In a Side by Side column justification procedure, recognition of the ending of an individual line, as by a Carrier Return code, is effective to initiate justification operations to determine the values of interword spaces and the quantity of long spaces, to subsequently effect reproduction of the data signals in the track just recorded, and to supply the same to the composer for producing a justified line of copy automatically.

In a Single Column justification procedure, data signals are recorded in a track on the media that corresponds to a line on the document in a correlated manner. Recognition of the end of an individual line, as by a Carrier Return code, effects relative movement of the transducer and media in order to position a new track on the media for storage of signals entered during the succeeding line on the document. The selection of a new track on the media to store data signals in a succeeding line may occur immediately upon recognition of termination of the preceding line or following the recording of justification data associated with the preceding line. Therefore, each track on the media may also carry with it justification data associated with the informational and functional data in the line or justification data may be stored in a separate facility. When all lines of a printed document are recorded track-by-track in the media, the mode of the apparatus is usually changed to a Playback mode whereupon the justification data for each line is first recognized and used to product justified printed copy during the subsequent reading of the data for that line.

CROSS REFERENCES TO RELATED
APPLICATIONS AND PATENTS

The following patents and applications are of interest:
U.S. Pat. 2,919,002, L. E. Palmer, inventor; entitled "Selection Mechanism for a Single Printing Element Typewriter."
U.S. Pat. 3,082,854, F. E. Becker et al., inventors; entitled "Typewriter Input Checking Mechanism."
U.S. Pat. 3,222,460, N. J. Albanes et al., inventors; entitled "Multiple Station Selection System."
U.S. Pat. 3,260,340, Henry C. Locklar and Donald E. Sims, inventors; entitled "Revision System for Data Recording and Printing Apparatus."
U.S. Pat. 3,297,124, Donald E. Sims, inventor; entitled "Data Recording and Printing Apparatus Capable of Responding to Changed Format."

The following applications are all assigned to the same assignee as the present application:
U.S. patent application Ser. No. 468,386, filed June 30, 1965, now U.S. Pat. 3,417,202, inventor R. A. Kolpek; entitled "System for Recording, Reproducing and Communicating Digital and Audio Signals With Control Adjuncts for Operator Use."
U.S. patent application Ser. No. 580,478, filed Sept. 19, 1966, inventors W. O. Cralle et al.; entitled "Justification Data Calculator and Display Device."
U.S. patent application Ser. No. 623,053, R. A. Kolpek, inventor; filed Mar. 14,1967, concurrently herewith; continued as application Ser. No. 802,700, filed Sept. 6, 1968, and entitled "Data System With Printing, Composing, Communication and Magnetic Card Processing Facilities."
U.S. patent application Ser. No. 62,024, J. E. Jones and R. A. Rahenkamp, inventors; filed Mar. 14, 1967 concurrently herewith; entitled "Composing Apparatus With Table Lookup Mode."
U.S. patent application Ser. No. 311,373, filed Sept. 25, 1963, now U.S. Pat. 3,346,086, W. O. Cralle et al. as inventors; and entitled "Proportional Escapement Apparatus for a Single Element Typewriter."
U.S. patent application Ser. No. 609,232 filed Jan. 13, 1967, W. L. Dollenmayer inventor; entitled "Transducer Driving Arrangement for Recording and Reproducing Apparatus."

OTHER REFERENCES

The following additional references are of interest:
IBM Customer Engineering Instruction Manual for the "Selectric"[1] Printer, Form No. 241–5032–2, dated January 1966.
IBM Customer Engineering Manual of Instruction for "Selectric" Input/Output Keyboard Printer, Form Number 241–5159–2, dated 1965.
IBM Customer Engineering Universal Reference Manual for "Selectric" Input/Output Keyboard Printer, Form Number 241–5182–0 dated June 30, 1963.
Certain equipment is also fully described in the IBM Customer Engineering Manual "Dictation Equipment" Form Number 241–5071, revised Oct. 5, 1962.
IBM Dictation Equipment Reference Manual, Form Number 241–5132, dated Oct. 22, 1962.
IBM "Selectric" Composer Instruction Manual, Form Number 241–5340–0, Oct. 19, 1966.

BRIEF BACKGROUND OF INVENTION

Field

Broadly, the invention pertains to automatically operative printing apparatus having facilities for storing informational and functional characters. The apparatus has provision for an operator to enter data into the system, for recognizing entered data signals and recording ---
[1] Trademark.

the same on a storage media, and for subsequently reproducing the previously stored signals for operation of the printing means automatically to produce a printed document.

In addition, the invention pertains to apparatus for producing justified printed matter from unjustified draft material. More particularly, the invention pertains to apparatus having storage facilities for recording and reproducing material to be printed, together with various logical and arithmetic facilities for determining justification factors for individual lines of printed matter. The invention has particular significance in an operator-oriented environment, that is, where an operator enters data into the system, controls the modes of operation of the system and maintains some measure of control over the finished justified printed copy resulting from operation of the system.

Description of the prior art

Various configurations have been proposed in the prior art for entering, storing, reproducing, and printing data. These have usually comprised an entry means for entering data, a storage means, such as a magnetic tape, magnetic drum, or the like, means for sensing previously stored signals and means for printing a document in response to reproduced signals.

Also, numerous arrangements have been proposed in the prior art for producing justified printed matter. These arrangements have usually comprised some form of entry device for entering into the system data to be justified, and a separate output device for utilizing data. Intermediate the entry and output phases of the systems, many diverse configurations have existed for producing justified copy. These have ranged from simpler mechanisms and circuits to elaborate arithmetic and computational mechanisms and circuits that involve considerable hardware and programming. In many cases, some form of storage facility has been provided for storing rough copy data prior to, during, and after justification. The output of many prior art systems has been directed to photographic facilities that expose galley film in accordance with the justified data. Other systems have facilities for preparing perforated tape, or comparable media.

SUMMARY

The present invention contemplates the provision of facilities for recording, and reproducing data with the line-by-line printing of a document being correlated with the track-by-track scanning of a record media. Also, the invention provides for a unitary entry and utilization device in the form of a printing composer having keyboard entry facilities for entering data to be stored on a record media and for responding to reproduced data signals to print documents. Associated with the system are various controls for establishing the required modes of operation including manual operator-oriented controls and automatic controls. In one form, the invention provides for the production of justified printed matter from rough copy data entered by the operator of the equipment. Associated with the printing composer unit is a data storage unit for recording rough copy data as it is entered by the operator and for reproducing the data subsequently in accordance with justification routines that are determined by a table lookup procedure. For convenience, a variety of justification factors are stored in a permanent location in the system. The justification data may be stored on the same media as the raw data to be justified.

In one mode of operation referred to as a "Side by Side" column justification, the operator prepares rough draft copy in a left-hand column on a document and justified copy is automatically printed in a right-hand column on the document. The sequence involves a recording of the rough copy data on the record media as it is entered and printed in the left-hand column on the document. This is followed by a scan operation during which the table lookup factors are accessed and the amount of justification required is determined. A number of space value and long space quantity means are set at this time. Upon completion of the Scan and Justify operation, the equipment is automatically operative to reproduce the data that was previously stored to make use of the justification factors and to print justified copy in the right-hand column of the document.

In another mode of operation referred to as "Single Column" justification, the operator enters rough copy data for recording on the media and concurrent printing on the document. This is followed by a Scan mode during which factors in the Table are reproduced and recorded on the media along with the rough copy data. No reproduction or actual justified printing of the data takes place until a plurality of lines has been recorded on the record media.

Accordingly, an object of the present invention is to provide facilities for recording, storing, and reproducing data in a correlated manner.

Another object of the invention is to provide entry means and printing means associated with a recording and reproducing device wherein an individual printed line on a document is correlated with a storage track on a storage media.

Still another object of the invention is to provide for entering and printing individual lines on a document and for storing the lines on a record media, with each printed line having an associated storage area or track on the record media.

In addition, an object of the present invention is to provide facilities for entering and printing data in conjunction with a unitary record media having storage tracks arranged in side-by-side fashion and of predetermined length to accommodate a maximum line expected to be encountered, with each printed line on a document being stored on the record media in an individual track and irrespective of whether the data actually recorded occupies the entire predetermined line length.

Still another object of the present invention is to provide for the recording, storing, and reproducing of data in a unitary record media with individual printed lines on a document each assigned to an individual track on the record media, regardless of data actually printed, to enable later expansion of individual lines up to the maximum line length available in the associated track on the media.

A further object of the present invention is to provide an entry and printing unit in association with a recording-reproducing unit with facilities for recording and reproducing a plurality of lines of information to be printed, with one mode of operation wherein each succeeding line is stored in a particular single track on the record media, and having an alternative mode of operation wherein each of a plurality of lines of information is stored in an associated individual track on the record media.

Still another object of the present invention is to provide for Side by Side column justification and Single Column justification with appropriate storage of data on an associated record media, in either case.

Also, an object of the invention is to provide apparatus with facilities for correlating the line-by-line storage of data on one media with the track-by-track storage of data on another media.

A still further object of the present invention is to provide for the recording, storing, and reproducing of data track-by-track on a record media, with or without justification, with local entry and utilization of the data and/or transmission and reception of the data by telecommunication facilities.

Also, it is an object of the present invention to provide apparatus for producing justified printed matter visually and manually, or automatically, as selected by the operator.

Another object of the invention is to provide justification apparatus that is operator-oriented with provision for the operator to enter "rough copy" data into the system, to control modes of operation of the system, and to receive printed justified results prepared by the systems.

Still anther object of the invention is to provide a justifying system in which the justification routines are performed with speed and efficiency, but involving a minimized amount of hardware.

In this connection, it is a further object of the invention to produce a justification system with considerable capabilities using available office products hardware with appropriate modification.

A still further object of the present invention is to provide a justification system that is operable to justify data on a Side by Side basis or on a Single Column basis, as desired. In either event, provision is made for storing the rough copy data entered by an operator prior to the justification routines.

Another object of the invention is to provide a justification system wherein justification information is stored in association with each of a plurality of categories of information, such as individual lines.

Another object of the invention is to provide a unitary justification system that receives rough copy data entered by an operator, that has provision for storing the copy data entered and for subsequently performing justification procedures with respect to the rough copy data, and for producing finally justified printed hard copy for the operator of the system.

Still another object of the invention is to provide composing apparatus that is adaptable for various composing functions, including centering and flush right, or flush left-flush right or other combinations.

The foregoing and other objects, features, and advantages of the invention will be apparent from the following more particular description of the preferred embodiment of the invention as illustrated in the accompanying drawings.

DESCRIPTION OF THE DRAWINGS

In the drawings:

FIGS. 2, 3, and 4 illustrate a visual justifying arrangement that is used during manual justification procedures with the printing composer of FIG. 1.

FIGS. 5 and 6 represent several settings of a number of dials for controlling the width of space increments during space operations in the printing composer of FIG. 1 as well as the number of long spaces (quantity) required.

FIG. 13 is a timing chart showing typical entry and justification routines involving Record, Scan, and Playback modes, and referred to as "Side by Side Column" justification.

DETAILED BACKGROUND OF INVENTION

Introduction

Figure 1:
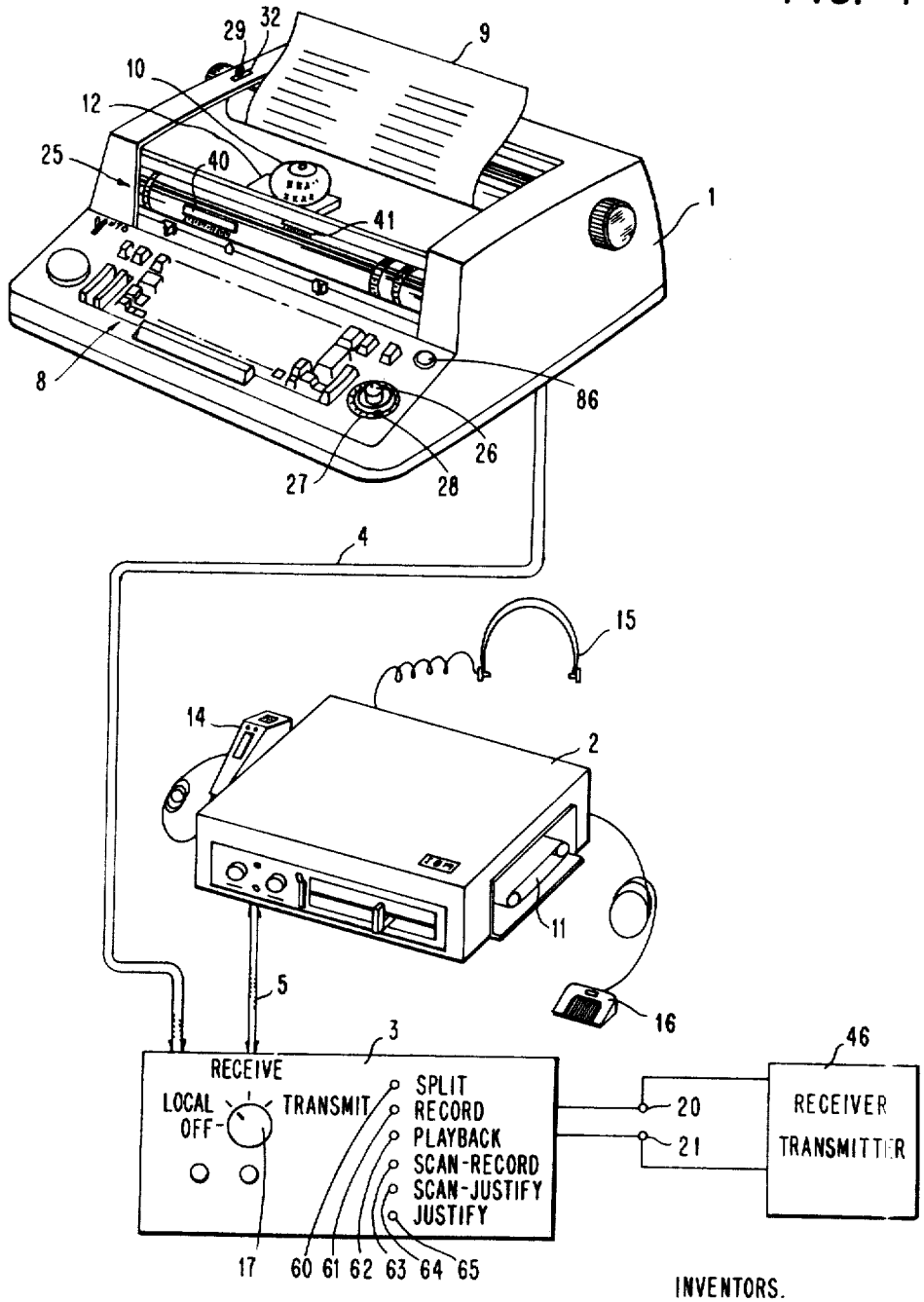
FIG. 1 is a system diagram that includes a printing composer, a recording-reproducing unit that may also be used for dictation, and an associated control unit.

A first embodiment of the invention is illustrated in FIG. 1 and includes a printing composer unit 1 that is interconnected with a recording-reproducing unit 2 through a control unit 3 by cables 4 and 5. The apparatus has facilities for entering and printing data, for recording the data, for performing justification routines, and for printing justified data. Composer 1 has the usual keyboard 8 for entering data and performing functional actions in the composer unit. By depressions of keys on keyboard 8, characters are printed on a document 9 by a single element print head 10. Document 9 is shown as having two Side by Side columns of printed information, the left-hand column constituting rough copy, and the right-hand column constituting justified copy according to the routines provided by the apparatus.

The recording-reproducing unit 2 has provision for recording and reproducing digital or audio signals stored in a magnetic record media 11, such as a magnetic belt.

The operation of the system, including the establishment of the various modes required, is controlled by a number of operator dials and switches on the composer unit 1, recording-reproducing unit 2, and control unit 3. When the Split button on control unit 3 is depressed, the composer unit 1 is effectively disconnected from the recording-reproducing unit 2 and each may be used independently of the other. In this mode, therefore, composer 1 is operated in a manual and visual mode of operation wherein the operator enters data into the composer, visually determines justification information for printed lines and thereafter operates the composer unit to produce justified lines as shown in the right-hand column on document 9.

During the Split mode, recording-reproducing unit 2 serves as a dictation unit and is controlled by means of a microphone 14 to record or reproduce dictated material. Subsequently, unit 2 can be used as a transcribing unit with a head set 15 and foot control 16.

Control unit 3 includes a number of other control buttons for establishing the desired modes of operation of the system. Of interest is a transmission knob 17 that is positioned in the local position in order for the system to be operated for justifying information by recording, justifying, and playback procedures. When knob 17 is positioned in the Local position in order for the system to to receive data over transmission lines 20 and 21 from a similar system or other data source. In the Transmit position of knob 17, data stored in the system of FIG. 1 is transmitted by lines 20 and 21 to another system of similar configuration, or an output device, such as a photographic unit, perforated tape unit, or magnetic storage unit, all possibilities being represented by block 46.

COMPOSER UNIT

Only a brief summary of the structural configuration and operation of the composer unit 1, FIG. 1, is presented here since the details are available in the various references previously given, particularly the 1966 Cralle application and the Composer Instruction Manual, Form No. 241–5340. The composer unit, with its single element print head 10, is based on the basic printing principles disclosed in the Palmer and Becker patents as well as the various manuals on the "Selectric" printer and "Selectric" Input/Output Printer. Generally, print head 10 has all characters of a type font arranged on the periphery of the head. The head is rotated and tilted under control of various linkages described in the references in response to depression of a character key on the composer unit to select one of the characters for printing. Subsequently, the head is actuated against the document, such as document 9, to effect printing of the selected character. Documents positioned in the composer unit 1 are maintained in a relatively stable lateral condition, left to right, and print head 10 is escaped during printing and spacing adjacent document 9.

The composer unit makes use of a pin wheel memory for storing escapement values mechanically as typing proceeds for later use during the printing of the data as more particularly described in the 1963 Cralle patent. The pin wheel memory described in the 1963 Cralle patent is designated 30 in FIG. 7.

Manual and Visual Justification Procedures

The manual and visual justification procedures are set forth in detail in the 1966 Cralle application and in the Composer Manual, Form 241–5340. To illustrate the utility of the present inventive arrangements, a brief summary of the justification procedures when performed manually and visually by an operator is presented below.

Primarily, the manual and visual justification procedures involve a data calculator and display device in the form of a justification indicator tube assembly 25, FIG. 1, a spacebar value dial 20, a spacebar quantity dial 27, and a justification lever 28, for establishing read and write modes of operation of the composer unit 1. The foregoing elements are shown in greater detail in FIGS. 2–6 and the spacebar dials are shown in some further detail in FIG. 9.

Several methods are available for doing justification work with the composer unit 1. The most common that is used is for the operator to type rough copy in the left-hand column on document and to thereafter type the justified identical copy in the right-hand column on document 9. Thus, the material is typed in columns or galleys. The procedure involves the determination of the line remainder of any rough printed line in relation to a predetermined line length. The line remainder is then distributed over the interword spaces encountered in the line involved. As described in the various references, composer unit 1 has a variable spacebar mechanism that is settable to any value from 3 to 9 units. The range of 3–9 is indicated in connection with the spacebar value dial 26, particularly in FIGS. 5 and 6.

During the typing of the rough line, the spacebar value dial 26 is set to "3" as shown in FIG. 5. The spacebar quantity dial is set to a value of "0" indicated by the line 31, FIG. 5. The justification lever 28 is set in the clockwise position shown in FIG. 5 to establish a Read mode of operation for composer unit 1.

A typical justification problem will illustrate the procedures for manual and visual justification. Consider a line of unjustified copy containing eight spacebar operations, each having a 3 unit value. If it is assumed that the end of the printed copy falls 19 units short of the desired right-hand margin of the copy, it is necessary to distribute the 19 units as evenly as possible throughout the eight spacebar operations. By increasing each of the eight spacebar operations by 2 units, a total of 16 units additional spacing is gained. A balance of 3 units remains. The 3 remaining units are distributed over the first three spacebar operations by increasing these spacebar increments from 5 units to 6 units, referred to as "long spaces." To summarize, the first three spacebar operations have a 6 unit value and the five succeeding spacebar operations have a 5 unit value. This spreads the information in the rough copy sufficiently to reach the desired predetermined justified line length.

Initially, the operator selects a print head 10 having the desired type font. The escapement values for type fonts differ and the composer unit has a pitch selector lever 29 that is set to one of three color coded settings indicated on an associated dial 32 that corresponds with the color coding on the top of the selected print element 10. The indicator tube assembly 25 has three corresponding tube positions that are color coded. The operator matches the colors by rotating the tube assembly to the same color selected by lever 29. This positions one of a number of windows 40 or 41 for use by the operator in visually determining the justification data for each line during the printing procedure. As shown more clearly in FIGS. 2 and 4, a typical window opening, such as opening 40, has an associated indicator scale 42. Mounted for rotation within the external tube assembly 25 is an internal tube having a plurality of color bars positioned for viewing through the selected window 40. The internal tube is provided with twenty (20) different color bars, each related to a corresponding specific number of spacebar operations that may occur within any printed line, that is, up to twenty spacebar operations.

Each of the twenty color bars on the internal tube is selected as one of 6 colors, each representing a spacebar value as shown in FIG. 3. The initial 3 unit value is represented by black.

As the operator types the rough copy, and each time a spacebar operation occurs, the inner tube in the indicator assembly 25 is indexed one step of rotation. Each time the inner tube rotates, a different color appears at the extreme left of the selected window, such as window 40 in FIG. 2. As the print head 10 enters the justified zone for the line, it picks up the outside of the indicator assembly 25 and slides the tube laterally across the color bar that has been placed in the window. Also, a bell ringing advises the operator that she is approaching the right-hand margin. When printing has been terminated for the line in progress, the operator visually takes two readings from the indicator window 40. These are a color and a number. The color selected is the extreme left color that is showing upon termination of printing of the line. As indicated in FIG. 4, it is assumed that the color green is the color that finally appears at the left-end of window 40 and adjacent scale 42. The various colors on the inner tube are correlated with corresponding colors adjacent the spacebar value dial and indicate the spacebar unit value that is to be used during the justification typing of the line in question. The position at which the color selected, in this case green, terminates or extends along the indicator dial 42 determines the setting of the spacebar quantity dial. In the case illustrated, the green color extends to a value of "7" along dial 42, as more particularly indicated by the arrow 44, FIG. 4.

Following inspection of the window 40 and scale 42, the operator sets the dials 26 and 27, FIG. 6. The spacebar value dial 26 is rotated until the pointer 26*a* is opposite an incremental value of 6 indicated by the color green. The spacebar quantity dial 27 is rotated until the number 7 is opposite the indicator mark 31.

Following the setting of the value and quantity dials the operator again types the line in the right-hand column on document 9 and the spacebar operation is such that the remainder determined by the settings of the dials in FIG. 6 is distributed evenly throughout the spacebar operations and the line is justified. The spacebar value dial determines the units of space for each long spacebar operation, in this case, seven (7) spacebar operations as determined by the spacebar quantity dial. Each time a spacebar operation occurs during the printing of the line, the spacebar quantity dial is indexed or stepped toward "0." Therefore, seven spacebar operations will have a unit value of 6 units. As the spacebar quantity dial rotates from "1" to "0" the spacebar value dial is stepped down one position and thereafter indicates a spacebar unit value of "5." Accordingly, all of the rest of the spacebar operations in this particular line will have a unit value of 5.

It should be noted that the automatic operation of the value dial 26 and quantity dial 27 occurs when the justification lever 28 is moved to the counterclockwise position shown in FIG. 6.

To summarize, the justification lever 28 positioned clockwise as shown in FIG. 5 establishes a "read" mode during which the rough copy is typed, each spacebar operation has a value of "3" and the indicator tube assembly is operated in order to provide the operator with justification data for the line. When the justification lever 28 is moved counterclockwise to the position shown in FIG. 6, the composer unit is placed in a "write" mode during which the value dial 26 and quantity dial 27 determine the incremental values of the spacebar operations in order to justify the line during the succeeding typing operation in the right-hand column.

Figure 9:
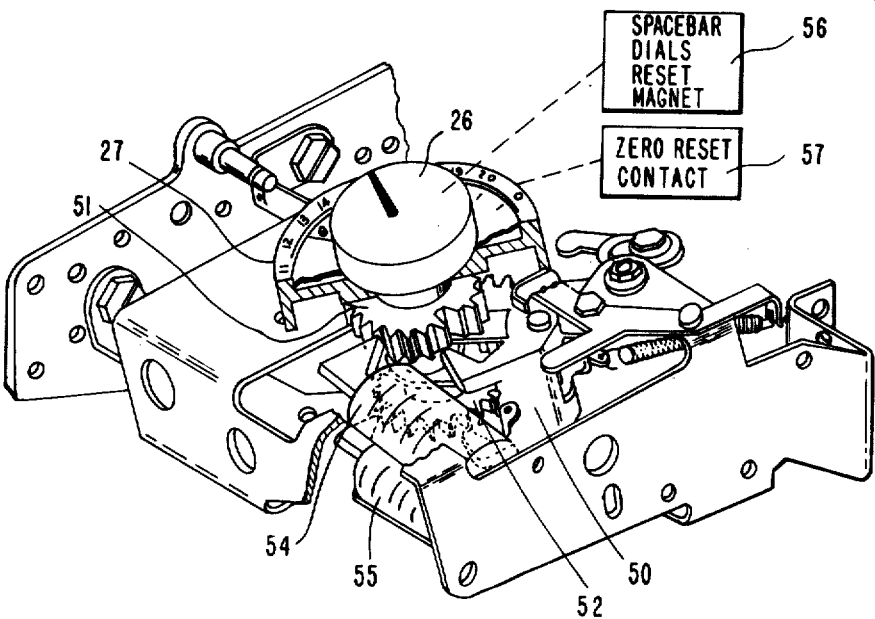
FIG. 9 is a partially cut-away view of the space value and quantity dials in FIGS. 5 and 6 together with associated mechanisms for moving the dials manually or automatically as required during justification procedures.

As more fully described in the 1966 Cralle et al. application, the pawl 50, FIG. 9, is operative to engage the quantity dial ratchet 51 to step it toward "0." When quantity dial 27 reaches "0," pawl 50 is automatically moved to engage the spacebar value ratchet 52 in order to step the spacebar value dial 26 by one increment as described in connection with FIG. 6.

Figure 14:
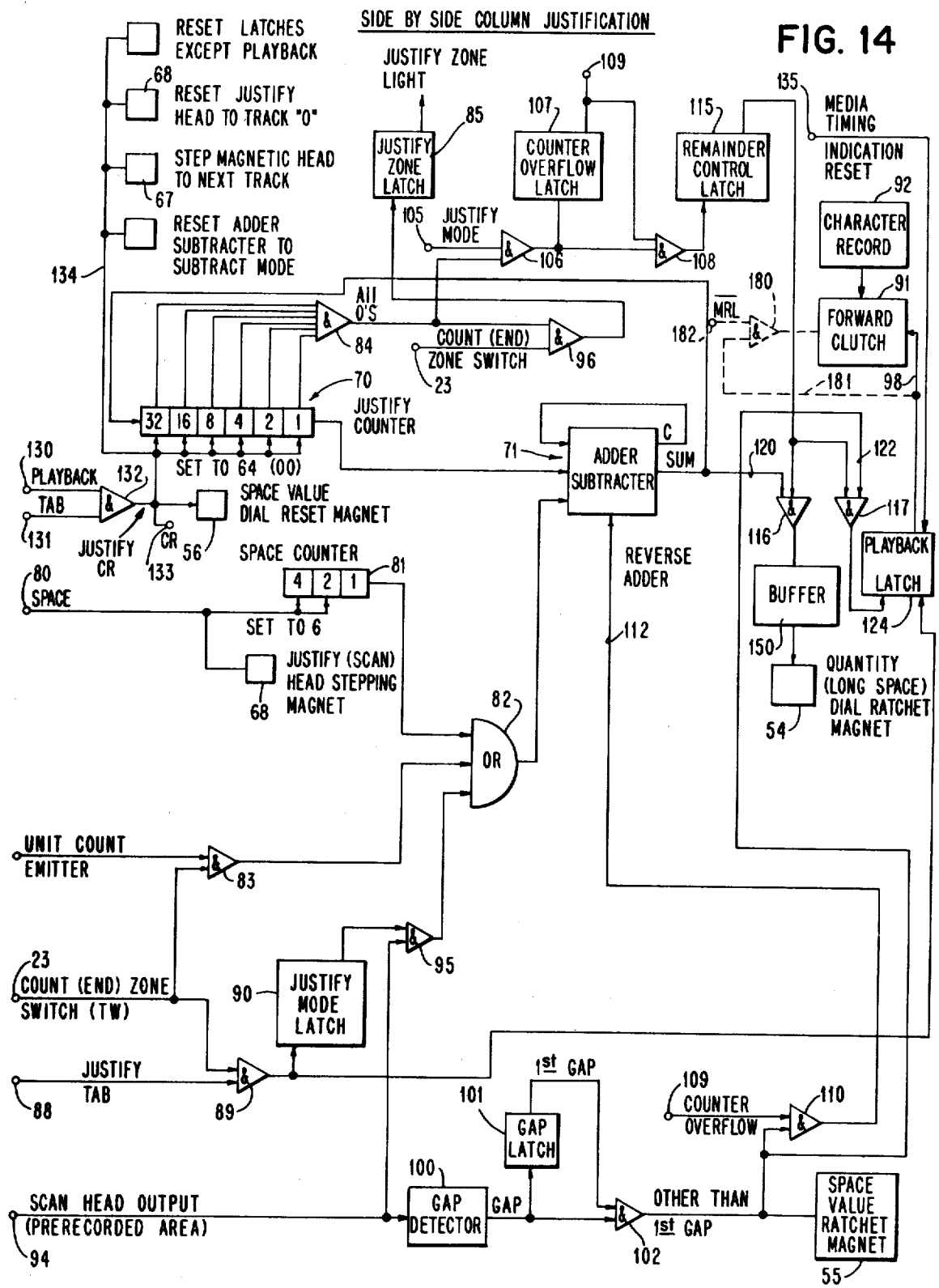
FIG. 14 shows a number of circuits, including counters and an adder-subtractor circuit for determining justification factors and controlling justification routines during a "Side by Side Column" justification mode.

To facilitate the stepping of the dials automatically under control of the circuits in FIG. 14, a spacebar quantity magnet 54 and a spacebar value magnet 55 have been added to the assembly in FIG. 9. Also, a space value dial reset magnet 56 is provided for automatically resetting the space value dial to the minimum value of "3" units and the quantity dial to the "0" setting. The fact that the mechanism is reset in this fashion is indicated by a "zero reset" contact 57. Magnets 54 and 55 may be operated by a stepping circuit (comparable to a stepping switch operation) to reset the mechanisms rather than having a separate reset magnet.

Figure 8:
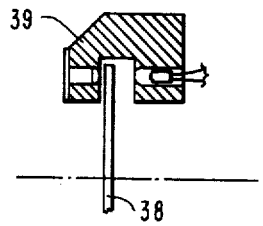
FIGS. 7 and 8 illustrate a modified escapement lead screw, pin wheel storage, and photo sensing arrangement for storing escapement increments of individual characters during printing in the composer unit of FIG. 1 and for supplying indications of the increments stored.
Figure 7:
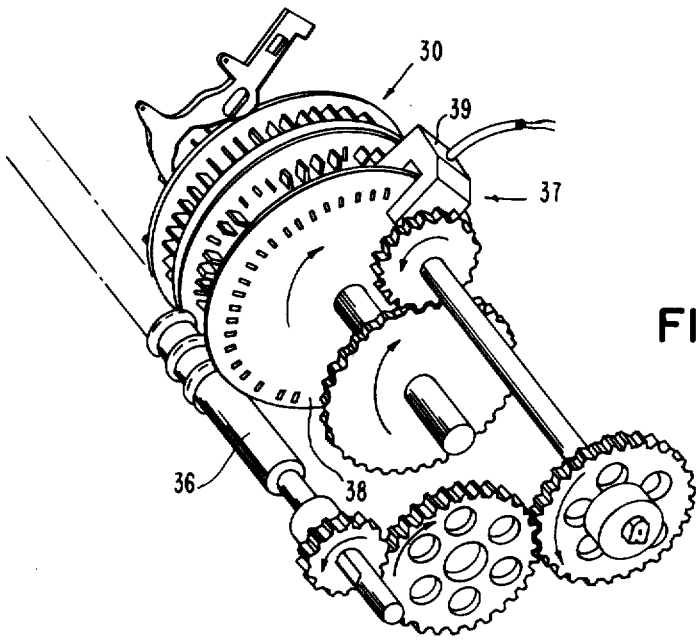

During the typing of the justified version of the copy under control of the quantity and value dials, escapement values of the various characters are sensed as they were established in the pin wheel assembly 30 under control of the escapement lead screw 36, FIG. 7. For the automatic version disclosed herein, the photosensing assembly 37 with disc 38 and photocell assembly 39 is provided to supply escapement signals for operating counting and arithmetic justifying circuits in FIG. 14. The discs and photocell assemblies are shown in crosssection in FIG. 8.

RECORDING AND REPRODUCING APPARATUS

Reference is made to the Albanes patent, the 1965 Kolpek patent and the dictation equipment manuals previously noted for the details of operation of the recording-reproducing unit 2, FIG. 1. The 1965 Kolpek patent describes the combination of a keyboard entry printer interconnected with a dictation unit for recording and reproducing digital signals. The digital signals are represented by trains of impulses that are recorded serially along tracks on a magnetic belt, such as belt 11, FIG. 1. The Kolpek apparatus includes a single recording-reproducing head assembly associated with a belt, such as magnetic belt 11, and that is operable forwardly and reversely to record and reproduce informating on the surface of the belt. The Kolpek apparatus has provision for splitting the printer and dictation unit so that each may be used independently as well as for transmitting and receiving information between two operating stations.

To accomplish the automatic justification and table lookup procedures presented herein, control unit 3, FIG. 1, is modified to include control buttons designated Split, Record, Playback, Scan-Record, Scan Justify, and Justify. These control buttons are designated 60–65 in FIG. 1.

The mechanisms for moving belt 11 and for driving and stepping the transducer head in the recording-reproducing unit are also shown in the references noted. These mechanisms include a backspacing or stepping assembly, as an example, that is operative to step the transducer head along a helical lead screw one track each time it is actuated. This achieves an incremental track-to-track stepping of the transducer. To perform rectilinear scanning of individual tracks as proposed herein, the lead screw is preferably provided with one tooth and/or valley (groove) associated with each track and is non-helical. That is, the teeth are not arranged in a continuous spiral helix along the length of the lead screw. However, any convenient arrangement can be used for track-to-track stepping, scanning and/or driving of the head and/or record media in relation to one another.

Figure 11:
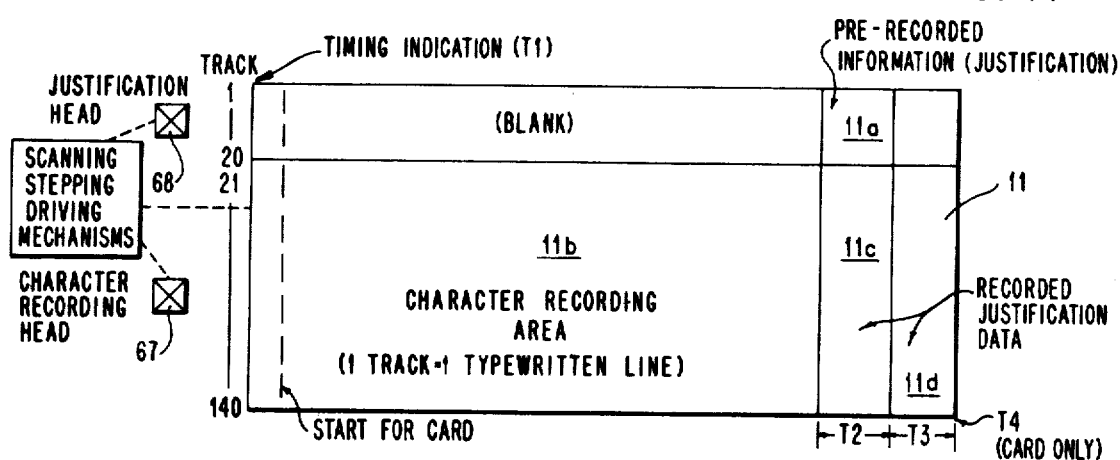
FIG. 11 is a suggested layout for recorded information on a record media in the recording and reproducing unit of FIG. 1.

To accomplish the justification procedures and table lookup presented herein, two head assemblies and associated stepping mechanisms are preferably provided in association with the record media 11, FIG. 11.

MEDIA LAYOUT

As shown in FIG. 11, the magnetic belt is assumed to be cut laterally so that its entire periphery is presented for viewing. That is, ordinarily the rightmost extremity of media 11 in FIG. 11 is contiguous with and merely a continuation of the leftmost extremity shown in FIG. 11. However, the display of media 11 as shown illustrates that other types of media may be used rather than a belt media with appropriate modification of the media feeding and transducer stepping arrangements in relation to the media. As an example, media 11 in FIG. 11 can represent a magnetic card record media equally as well as a magnetic belt record media.

Media 11 is divided into a number of predefined areas for storing information. Media 11 is assumed to have 140 tracks for storage of information. A portion of tracks 1 to 20 is assigned to the permanent storage of data in table form for use in justifying lines of information. More specifically, section 11a of the belt is set aside for this purpose. Tracks 21 to 140 in section 11b of the belt are set aside for the storage of data related to individual lines of printed information. Preferably, each track in section 11b is associated with a particular typewritten line on document 9. Included in sections 11c and 11d of media 11 is an area that is available for the recording of justification data for each of the lines in tracks 21–140. During Single Column justification, section 11c ordinarily stores spacebar value information, and section 11d stores a long space quantity information. Hence a line of information in track 21 would ordinarily have the associated justification data stored in a corresponding line 21 in sections 11c and 11d.

AUTOMATIC JUSTIFICATION WITH TABLE LOOKUP

The automatic justification procedures that are contemplated by the present invention are particularly discussed in connection with FIGS. 10–14. However, reference will also be made to the other figures, particularly in connection with modifications involved for automatic justification.

It is believed that the operation for accomplishing automatic justification of printed matter according to the present inventive arrangements will be greatly clarified by reference to the following Table of Operations.

TABLE OF OPERATIONS

| Step | Mode and Action | Recorder | Justify Counter Status | | Space Value Dial Status (Ratchet) | Quantity (Long Space) Dial Status (Ratchet) |
|---|---|---|---|---|---|---|
| A | Record. Depress keys. Print and Space. (Subtract 6 for each space prior to End Zone.). | Record data. Also, step Justify head one track for each word space. | 64 −6 —— 58 −6 —— 52 etc. | Justify counter | [1] 3 | (²) |
| B | Record. Reach End Zone—64 units remain (Print carrier encounters End Zone Switch). Assume 5 spaces prior to reaching End Zone. | Record data. Also step justify head to track No. 5. | 64 −30 —— 34 | (5×6) Total | 3 | 0 |
| C | Record. Depress keys. (Subtract 9 from counter for each space). (Subtract unit value from counter for characters printed). | Record data | 34 −34 —— 0 | (=64) | 3 | 0 |
| D | Record. Reach Justify Zone. Counter passes zero. Justify light comes on, notifies operator can terminate line where convenient. | do | | | 3 | 0 |
| E | Record. Assume 13 units of printing and/or spacing into Justify Zone. | do | 64 −13 —— 51 | | 3 | 0 |
| F | Scan-Justify Playback OR Scan-Record Justify Data. Tab or Carrier Return Ends line. Print head tabs or returns. (1) In Side by Side column Justification, tab moves print head to right-hand column for immediate Justification-Playback OR (2) Scan-Record Justify Information with associated line. Assume (1), Side by Side. | Switch on Justify head. Read pulses. | 51 −34 —— 17 | Line remainder | 3 | 0 |
| G | Scan. Divide Line Remainder by successive subtractions. | Justify head scans first set of 5 pulses. | 17 −5 —— 12 | | 3 | 0 |
| H | Scan. Ignore First Gap, but Second Gap ratchets Space Dial. | Justify head scans gap | 12 | | 3 +1 —— 4 | 0 |
| I | Scan. Detect 5 | Justify head scans second set of 5 pulses. | 12 −5 —— 7 | | 4 | 0 |
| J | Scan. Detect Third Gap | Justify head scans gap | 7 | | 4 +1 —— 5 | 0 |
| K | Scan. Detect 5 | Justify head detects 5 | 7 −5 —— 2 | | 5 | 0 |
| L | Scan. Detect Fourth Gap | Justify head scans gap | 2 | | 5 +1 —— 6 | 0 |
| M | Scan. Detect 5. Counter passes through zero. Set Overflow latch. Reverses count direction. | Justify head detects 5 | 2 64 −2 −3 —— —— 0 61 | | 6 | 0 |
| N | Scan. Detect Gap | Justify head scans gap | 61 | | 6 +1 —— 7 | 0 |
| O | Scan. Detect 5. Counter again passes zero. Set Remainder latch. | Justify head detects 3 pulses in next group of 5. | 61 +1 —— 62 +1 —— 63 +1 —— 64=00 | | 7 | 0 |
| P | Scan. Increment Quantity (Long Space) Dial number of spaces. | Justify head detects remaining 2 pulses in next group of 5 | 00 +1* —— 1 +1* —— 2 | | 7 | 0 +1* —— 1 +1* —— 2 |

| | | | Space 1 | Space 2 | Space 3 | Space 4 | Space 5 |
|---|---|---|---|---|---|---|---|
| Q | Playback mode. Justify Space Value and Quantity Dials distribute Remainder. As shown. | Standard | 3 | 3 | 3 | 3 | 3 |
| | | Distributed Remainder | 4 | 4 | 3 | 3 | 3=17 |
| | | Total Increments | 7 | 7 | 6 | 6 | 6 |
| R | End Playback. Reset circuits and mechanisms | | | | | | |

[1] Minimum.  ² Reset.

The table has a number of headings as follows: Step, Mode and Action, Recorder, Justify Counter Status, Space Value Dial Status, Quantity (Long Space) Dial Status. The table of operations comprises a number of individual operational steps designated A–R. The mode of the system of FIG. 1, together with the action and the status of various significant components, is indicated in the table.

Depression of Record button 61, and Justify button 65 places the equipment in condition for entry of data by keyboard 8, printing of the data in the left-hand column on document 9 and recording of rough copy data on a selected character recording track in section 11b of media 11, FIG. 11. The apparatus is also effective to operate the spacebar dials reset magnet 56 and the zero reset contact 57 to reutrn the dials to the condition shown in FIG. 5.

Of particular significance in the operation of the automatic justification is the counter 70, FIG. 14. Counter 70 is operative during various stages to store justification information and in connection with the Adder-Subtracter 71, FIG. 14 is effective to operate the space value magnet 55 and quantity magnet 54, FIGS. 9 and 14 in an automatic fashion to subsequently control the playback of recorded information and to justify the same.

SIDE BY SIDE COLUMN JUSTIFICATION

The Table of Operations is predicated on an initial typing of rough draft in a line of information on document 9 in the left-hand column with concurrent recording of the data in an associated track in section 11b of the media in FIG. 11. Media 11 is moved incrementally for each character by operation of forward clutch 91 from Character Record circuit 92. Concurrently with the printing of the rough draft line, the circuits of FIG. 14 determine various justification factors that are later used to set the spacebar quantity dial and the spacebar value dial and that in a sense, perform in an automatic way the functions of the indicator tube assembly previously discussed in FIGS. 2–4. A sshown in FIG. 13, the apparatus is operative in a Record mode to record the line of information. Upon termination of the rough draft line, the equipment is placed in a Scan-Justify mode by depression of the Tabulation key on composer unit 1, FIG. 1, whereupon automatic justification and arithmetic operations are performed in the circuits of FIG. 14 and the quantity dial 27 and the value dial 26 are set to the proper positions. Subsequently, data stored in the media, FIG. 11, is reproduced during a Playback mode and the line is justified as in the right-hand column in document 9.

RECORD ROUGH COPY

Step A

The Table of Operations will be presented with particular reference ot FIGS. 13 and 14. Initially, counter 70 is reset to a status of "64." As indicated, this can occur when the Record and Justify buttons are depressed and it may also occur upon recognition of a Justify Carrier Return operation for print head 10 which indicates the termination of the justified line and the beginning of the next rough copy line. In Step A, the mode of the system is "Record." Characters of information are entered through keyboard 8 and printed in the left-hand column on document 9. They are also recorded by recording head 67, FIG. 11. Head 67 is stepped to one of the recording tracks in section 11b by escapement mechanisms more particularly described in the various dictation references. Space operations occurring during the printing of the rough draft line are handled in a special way. For one thing, each time a Space operation occurs the justification head 68 is stepped one track position by mechanisms that are comparable to those for stepping the recording head 67. Accordingly, if one Space operation occurs during the line, head 68 remains at track 1. If three spaces occur, justification head 68 is stepped to track 3. Five Space operations step head 68 to track 5. In this fashion, head 68 performs a table lookup concurrently with the typing of the rough draft in readiness for subsequent justification routines that make use of the information recorded in the justification track selected by stepping of head 68. As shown in FIG. 13, it is assumed that five spacebar operations occur in the line in progress.

Each time a Space operation occurs, a unit count of 6 is subtracted from the count of 64 that was initially stored in the justify counter 70. The stepping of the justify or scan head 68 and the subtraction of 6 is illustrated in FIG. 14. A Space operation is signaled at terminal 80 and sets the space counter 81 to a count of 6. The subtraction is performed through Or circuit 82 and Adder-Subtracter circuit 71. Since each Space operation subtracts a value of 6, the assumed number of Space operations of 5 subtract, in this case, a total of 30 from the initial value of 64 in the justify counter, leaving a net of 34 for the line in progress.

Step B

Figure 10:
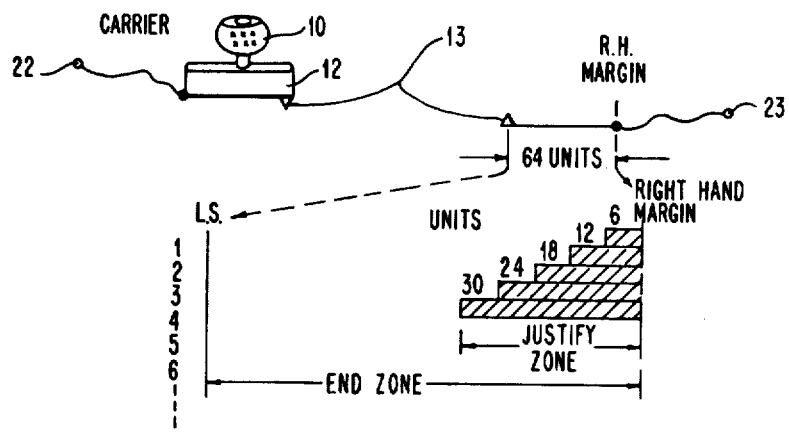
FIG. 10 shows the relationship of the print head in the composer unit of FIG. 1, and End Zone, and a Justify Zone near the right margin of printing.

As best seen in FIGS. 1 and 10, print head 10 is mounted on a carrier 14 for movement during the printing of characters and during Space operations. When carrier 14 reaches a position that is 64 units from the right-hand margin, FIG. 10, an End Zone Switch 13 is closed to indicate this fact. Potential at terminal 22 is then directed to terminal 23 for controlling the circuit in FIG. 14. The 64 unit area at the end of the printed line is termed the "End Zone." The potential is applied at terminal 23, FIG. 14 and gates one input of an And circuit 83. The End Zone switch could also be operated by a cam carried by the print head carrier.

Step C

Following the gating of And circuit 83, any further characters that are printed and any further Space operations establish unit counts that are subtracted from counter 70. These unit counts are derived from the photosensing assembly 39 as disc 38 rotates in synchronism with the setting of the pins in assembly 30, FIG. 7. The count impulses are applied through Or circuit 82, Adder-Subtracter 71, and are effectively subtracted from counter 70. It should be noted that during this interval, any Space operation effects a subtraction of 9 units from counter 70.

Step D

Counter 70 is a ring type counter which counts forward or reverse and provides a signal whenever it reaches "0" in either direction. For the present purpose, the direction of counting of counter 70 is not too significant, but the quantity stored therein is the controlling factor in the justification procedures. The "0" status of counter 70 is reflected through And circuit 84, and through And circuit 96 in conjunction with the End Zone switch terminal 23, FIG. 14, to set a Justify Zone latch 85 and to energize a Justify Zone lamp 86 on composer unit.

The reader will note that the space value dial and the quantity dial remain at their initial settings of "3" and "0," respectively.

The lighting of the justify lamp on printer 1 indicates to the operator that the present line may be terminated at some convenient place and that the remainder can readily be distributed among the spacebar operations in order to justify the line. The "0" setting of counter 70 corresponds to the beginning of the justify zone in FIG. 10.

Step E

Printing and/or spacing continues into the justify zone until the line is terminated by the operator. It is assumed for purposes of illustration in the Table of Operations that 13 units of printing and/or spacing occur in the present line. Counter 70 is stepped by unit signals so that it stores a count of 51 representing the complement of the extent of penetration into the justify zone (64—13=51).

Step F

Upon termination of the line in progress, the operator depresses the Tab keybutton on keyboard 8 of composer unit 1 to effect motion of print head 10 to the beginning of the rightmost column of document 9. A Tab code is recorded on belt 11. This effectively ends the "rough copy" line and further establishes routines according to FIG. 13 which place the apparatus in a Scan mode to determine the justification factors for the line involved.

SCAN-JUSTIFY MODE

To simplify the presentation, it is assumed that the equipment goes directly into a Scan-Justify mode and subsequently into a Playback mode for the line just completed, to accomplish a Side by Side column justification.

15

Figure 12:
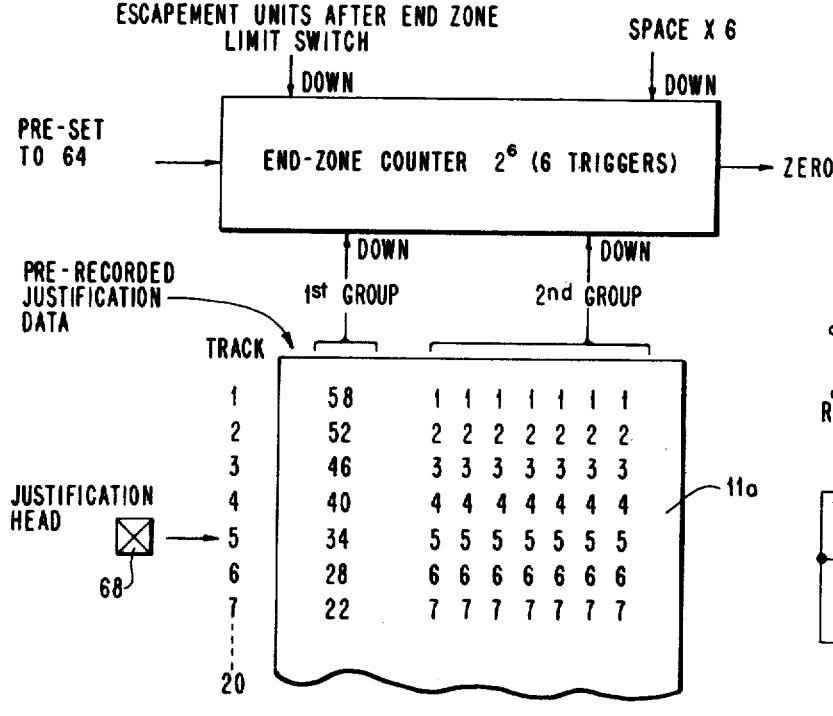
FIG. 12 illustrates justification tables that are permanently stored in the system, and in the assumed case on the record media of FIG. 11, tracks 1–20.

The Tab signal to terminal 88, FIG. 14 together with the End Zone switch condition gates And circuit 89 and sets a Justify Mode latch 90 to control subsequent operations. The output of And circuit 89 also energizes the forward clutch mechanism 91 to move media 11. Head 68 now scans the recorded justification signals in track 5. Referring to FIG. 12, the values stored in track 5 consist of a first group of signals or coded representations representing a value of "34." This is separated by a gap and subsequently in track 5 are recorded a series of values representing individual factors of "5," each separated from the succeeding factor by a gap that is recognizable during scanning by head 68 in track 5.

The factor "34" sensed by head 68 is applied at terminal 94, FIG. 14, and passes through And circuit 95, Or circuit 82, and Adder-Subtracter 71 together with the count stored in justify counter 70 to derive a value in counter 70 that represents the line remainder. Counter 70 previously stored 51 and, with the factor 34 subtracted, now stores a count of 17 which indicates a line remainder value of 17.

Step G

The apparatus is now operative to divide the line remainder in order to develop the values required for the setting of the value dial 26 and the quantity dial 27, FIGS. 5 and 6. The division is effected by a series of subtractions from the value in the Justify counter. Accordingly, the first factor "5" is sensed by head 68, applied to terminal 94, FIG. 14, and subtracted from the value in counter 70 of "17," resulting in a new value of "12."

Step H

The circuits of FIG. 14 are provided with a gap detector 100 that senses the gaps between the succeeding factors "5" in order to automatically energize the space value ratchet magnet 55, FIGS. 14 and 9. The first gap between the factor "34" and the factor "5" is ignored due to the setting of a Gap latch 101 which degates And circuit 102. All other gaps subsequently sensed are provided through And circuit 102 to step magnet 55 and to move the spacebar value dial 26 one space each time magnet 55 is energized.

The action is illustrated during the Scan interval, FIG. 13. By reference to the Table of Operations, it is seen that the space value dial now has a setting of "4."

Step I

The next factor "5" is sensed in track 5, and is subtracted from the value "12" in counter 70 for a result of "7."

Step J

The third gap in track 5 is sensed by head 68 and through the And circuit 102, previously discussed, again steps the space value ratchet by energizing magnet 55. The space value now has a setting of "5."

Step K

The third factor "5" is sensed by head 68 and subtracted from the contents "7" of counter 70 resulting in a value of "2."

Step L

The fourth gap in track 5 is sensed by head 68 and applied through the circuits discussed to step the space value dial to a new setting of "6."

Step M

Sensing of the next factor "5" by head 68 steps counter 70 to a value of "61," during which counter 70 passes through the all zero condition. Counter 70 stores a count of "61." With the apparatus in a Justify mode as indicated by latch 90, FIG. 14, being set, the "Justify mode" input at terminal 105 is up to And circuit 106. When counter 70 passes through "0," And circuit 84 provides another input to And circuit 106 which then supplies an output to set the Counter Overflow latch 107. One output from latch 107 gates an input of And circuit 108 and the same output from terminal 109 gates And circuit 110.

Step N

Detection of the next succeeding gap in track 5 by head 68 completes the gating of And circuit 110 to reverse the count direction controlled by line 112 to Adder 71 and again steps the space value dial 26 by energizing magnet 55, FIGS. 9 and 14. The Justify counter status is "61."

Step O

Head 68 now senses the pulse in the next factor "5." With Adder-Subtracter 71 reversed by line 112, the first 3 pulses are effectively added to the count of 61 in counter 70 resulting in a status of "64" which is the same as "0."

As counter 70 passes through the "0" state, And circuit 84 is again gated and provides a gating signal to And circuit 106. The output of And circuit 106 to And circuit 108 in connection with the previously established output from latch 107 sets the Remainder Control latch 115. The output of latch 115 is supplied to two And circuits 116, and 117.

Step P

The purpose of the circuit actions in Step P is to step the quantity (Long Space) dial 27 in order to establish how many spaces are to be performed during subsequent printing of the line involved at the higher space value of "7" that was established during Step N. Accordingly, the two remaining pulses in the factor "5" are added to counter 70 and at the same time applied by line 120 to gate And circuit 116. And circuit 116 provides an output through a buffer circuit 150 to energize magnet 54 which, with reference to FIG. 9, steps the quantity dial 27 one index position. The next pulse in the factor "5" is again provided by line 120 and again energizes magnet 54 to step quantity dial 27.

No further pulses are available in the factor "5" that has just been sensed and therefore, the spacebar quantity dial is finally set at "2" in readiness for the justification procedures.

To summarize, the space value dial is at a setting of "7" and the spacebar quantity dial is at a setting of "2."

Step Q

Upon detection of the gap following the factor "5" just used, And circuit 117 is gated by line 122 and, with latch 115 set, provides an output to set the Playback latch 124. This continues the energization of clutch 91.

In FIG. 13, setting of the Playback latch establishes a Playback mode in the equipment wherein the rough copy data recorded during the Record mode is sensed and provided to composer unit 1 for printing in the right-hand column on document 9.

As set forth in the Table of Operation for Step Q, the first two spaces in the line will have an incremental value of 7 units each. When the spacebar operation number 2 is completed, the quantity dial 27 moves to "0" and concurrently moves the space value dial 26 to a setting of "6" as described in connection with the manual and visual justification procedures.

Therefore, the three remaining spaces are performed with an incremental value of "6" units each.

By the foregoing procedures, the remainder of "17" in the line is distributed over the five spaces and the line is justified.

Step R

Printing of characters and spacing continues until the previously recorded Tab code at the end of the rough copy data is recognized. The Tab signal at terminal 131, FIG. 14, together with the Playback signal at terminal 130 that indicates a Playback mode is applied to gate And circuit 132. The output of And circuit 132 represents a Justify Carrier Return indication that effects a Carrier Return operation on the composer unit 1 by a signal from terminal 133. The Justify Carrier Return signal from And circuit 132 is also applied to reset the space value dial reset magnet, FIG. 6, and by line 134 to perform other reset functions. The reset operations include the following. All latches are reset at this time except Playback latch 124. The Justify Head is reset to track "0." The magnetic recording and reproducing head is stepped to the next track on media 11. Adder 71 is reset to the subtract mode in readiness for arithmetic operations required for the rough copy of the next line. Also, at this time the Justify counter 70 is reset to 64 (00).

The continued set condition of Playback latch 124 operates forward clutch 91 to continue the movement of media 11 past the magnetic head 67. As soon as the beginning of media 11 is recognized, as by a timing indication T1, a signal is applied by terminal 135, FIG. 14, to reset Playback latch 124. This drops forward clutch 91 and record media 11 is positioned in readiness for the typing of rough copy in the next line on document 9.

SINGLE COLUMN JUSTIFICATION

In the assumed example shown in the Table of Operations, only a single line of data is recorded on media 11, a Scan mode is then initiated to establish the proper justification information for the line, and the data is then sensed and immediately printed in the right-hand column on document 9.

As an alternative, however, a Single Column Justification (or Scan Record) mode can be established wherein justification factors in section 11a on media 11, FIGS. 11 and 12, are read in the spacebar track selected during printing of the line and are concurrently recorded in sections 11c and 11d on the media in association with the line just completed. The latter type of operation results in the recording of all lines or a plurality of lines for a document, such as document 9, FIG. 1, with each line having associated justification information stored with it for use at a later time. Upon completion of the recording of all lines and the associated justification information, the apparatus can subsequently be placed in a Playback mode by depression of button 62, FIG. 1, whereupon the data for each line together with its justification information is sensed and the document printed back on composer unit 1 automatically and in its entirety.

Figure 16:
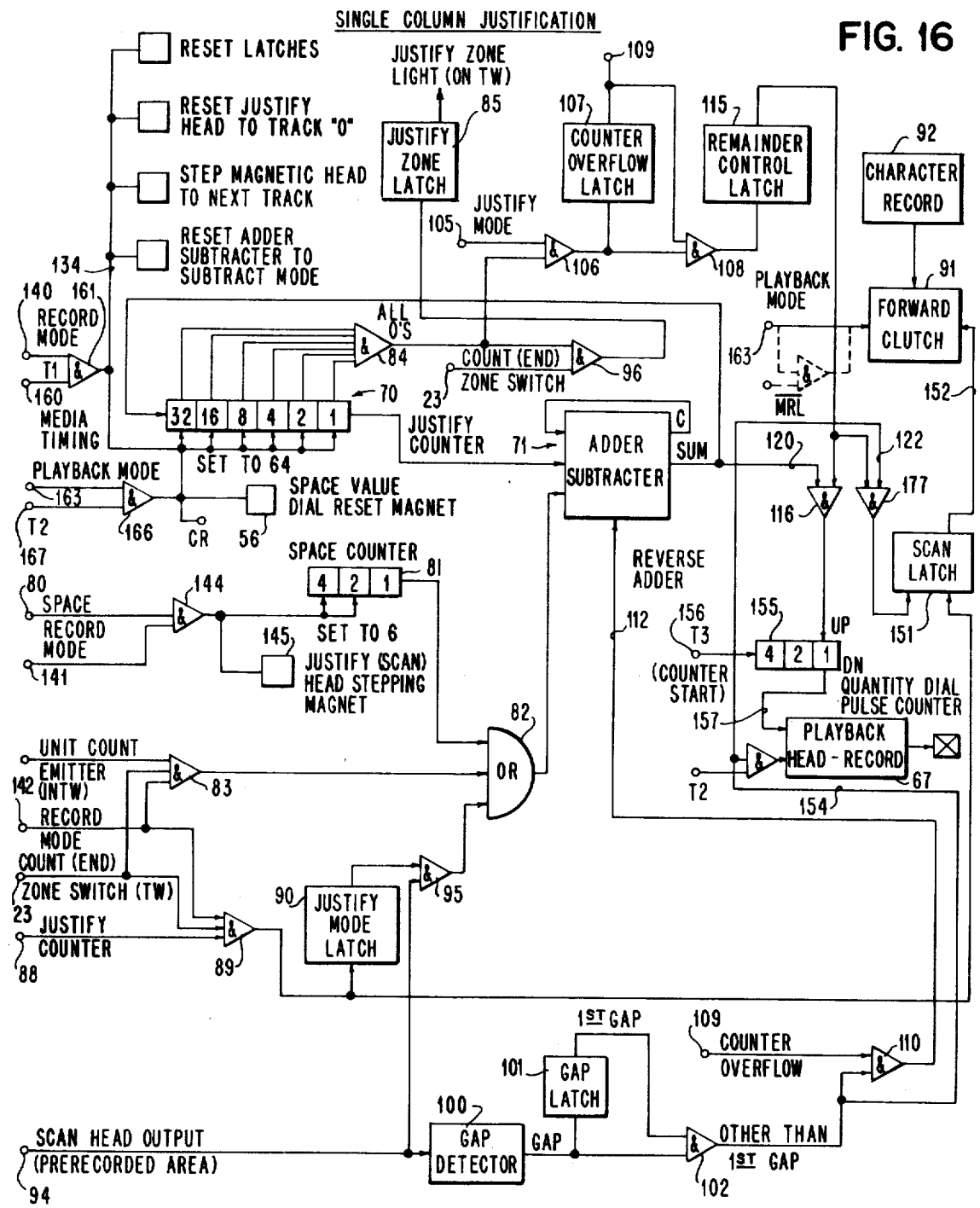
FIG. 16 is a circuit diagram that is similar to the circuit in FIG. 14, but which is directed to "Single Column" justification procedures.

FIG. 16 shows the circuits that are provided for Single Column justification. The circuits make use of most of the components previously shown in FIG. 14. Where this is the case, corresponding reference numerals are used.

Depression of Record button 61, FIG. 1, provides Record mode signals to terminals 140, 141, and 142. The space signals at terminal 80, with the Record mode signal at terminal 141, conditions And circuit 144 to provide setting impulses to Space counter 81 and to step the Justify Head stepping magnet 145. This is comparable to the counting of space increments that occurred during the Side by Side column justification in FIG. 14. Forward clutch 91 is energized to move media 11 past the record head under control of the Character Record circuit 92 as previously described.

Recording of characters and spaces in the selected track on media 11, which is assumed to be track 21, continues until print head carrier 12 reaches the End Zone to supply an End Zone signal at terminal 23. The operator continues to type characters and to space in the End Zone. The unit count emitter input to And circuit 83, together with the End Zone and Record mode inputs, conditions And circuit 83 to subtract escapement values for each character encountered in the End Zone through Or circuit 82 and Adder-Subtracter 71. During this time, Space characters are counted as nine increments. The "0" condition of Justify counter 70 is combined with the End Zone indication to condition And circuit 96 and set the Justify Zone latch 85. This energizes the Justify Zone lamp 86 to inform the operator that the line can be terminated at any convenient place. This action is comparable to Step D in the Table of Operations previously described.

When printing is completed, the opertator depresses a Justify Carrier Return keybutton which supplies a signal to terminal 88 and with the other conditions shown, And circuit 89 sets Justify Mode latch 90. The output by line 150 also sets a Scan latch 151. This activates forward clutch 91 by line 152.

SCAN AND RECORD MODE

Reference is made to FIG. 11 which shows a number of circuit breaker timings designated T1, T2, T3, and T4. Signal T1 indicates the beginning of the tracks in media 11. Circuit breaker T2 is closed while scanning proceeds in sections 11a and 11c on the media. Circuit breaker T3 is closed while scanning of section 11d on media 11 proceeds. Circuit breaker T4 gives a timing pulse at the end of section 11d, and is provided with the card embodiment to be discussed.

The objective of the present justification mode is to record justification data in association with the rough copy data just completed. For convenience in Playback, it is preferable that the justification data be recorded in the assigned areas 11c and 11d in the same track as the rough copy data with which it is associated.

With Scan latch 151 set, signals are provided from the scan head 68 to terminal 94 as in the previous embodiment. The signals are applied through And circuit 95, Or circuit 82, and Adder-Subtracter 71 to step Justify counter 70 in a manner comparable to that described in connection with Side by Side column justification. Also the signals are applied through the gap detection circuits near the bottom of FIG. 16. However, in the present mode of operation, the signals derived from Scan head 68 are applied to the recording head 67 concurrently with sensing so that they are recorded in sections 11c and 11d in association with the line of data just completed.

The arithmetic operations performed during Single Column justification are comparable to those performed during the Side by Side column justification, with the main difference being that the results of the arithmetic operations are recorded on the media rather than operating the space value and quantity dials immediately and directly as in the Side by Side column justification. The gaps, other than the first gap, are recognized and a signal for each gap is applied by line 154 to the record head 67, as determined by the justification track that was selected during the recognition of space operations during the printing of the rough copy. Counter Overflow latch 107 sets as before when counter 70 passes through the "0" state. This conditions And circuit 110 so that the next gap reverses the mode of Adder-Subtracter 71 by line 112. The pulses are counted in the reverse direction with counter 70 again passing through zero. This conditions And circuit 108, and sets Remainder Control latch 115, which in turn conditions And circuits 116 and 117. The balance of pulses in the group then passes by line 120 and through And circuit 116 to counter 155, where they are accumulated. Counter 155 stores the remainder, that is the quantity of long spaces required, until time T3 which corresponds to section 11d in media 11. At this time, a gating signal to terminal 156 steps counter 155 and provides impulses by line 157 for recording by head 67 in section 11d.

Scan latch 151 remains set to energize forward clutch 91 until the timing indication is reached on media 11.

The Record mode input at terminal 140, together with the T1 input at terminal 160, conditions And circuit 161 which resets all latches, resets the justify head to track "0," steps the magnetic head to the next track, resets Adder-Subtracter 71 to the Subtract mode, sets counter 70 to a "0," and resets the space value and quantity dial magnet 56. The latter resetting action is of no consequences at this time, since the space dials are assumed not to have been previously operated.

19

Recording of characters and justification data continues in the manner described until the end of the rough copy, as required by the operator.

PLAYBACK MODE FOR SINGLE COLUMN JUSTIFICATION

It is now assumed that the recording of the rough copy and associated justification data has been completed and that the operator desires to playback the information in a justified form. In order to do this, it is first necessary to gain access to the justification data of an individual line before the data in that line is reproduced for printing.

The operator depresses Playback keybutton 62, FIG. 1, to initiate the Playback operation. In the Playback mode, head 67 is placed in track 20 which is blank until it reaches section 11a. The Playback mode signals are applied to terminals 162 and 163. As soon as the T2 circuit breaker closes which indicates the beginning of sections 11a and 11c on media 11, a signal to terminal 163 and terminal 167 conditions And circuit 166 to step head 67 to the next track which is track 21. The And circuit 166 output resets all of the various circuits and mechanisms by line 134.

Figure 17:
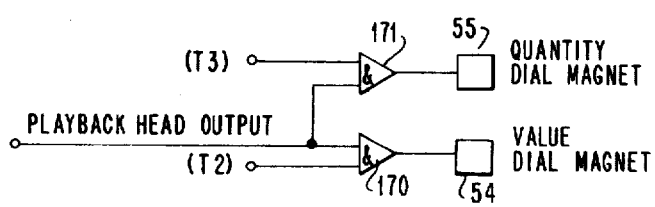
FIG. 17 illustrates a value and quantity setting circuit that is used in the "Single Column" mode.

Referring to FIG. 17, the spacebar value signals stored in section 11c, track 21, are applied through AND circuit 170 to step the value dial 26 by operation of the value dial magnet 54. At time T3, And circuit 171 is conditioned and quantity dial 27 is stepped by energization of the quantity dial magnet 55. With the assumption that media 11 is a magnetic belt, the belt is moved around until the circuit breaker timing indication T1 exists. The apparatus remains in a Playback mode and forward clutch 91 continues to be energized by line 163. The rough copy data is now sensed in track 21 and printing of the characters stored in the track proceeds in a manner comparable to that which occurred during playback of the information in a Side by Side column justification mode. Accordingly, the value dial 26 and quantity dial 27 control the operation of composer unit 1 to produce a justified line of copy for the data in track 21.

At the end of the line of rough copy data, head 67 senses timing mark T2 which is applied to And circuit 166 to step head 67 in order that the justification data for track 22 may now be sensed and applied to the value and quantity magnets as before in readiness for the sensing of the recorded data in track 22. The resetting and timing situations encountered for track 22 are comparable to those that occurred during the playback of the data in track 21.

MAGNETIC CARD PROCESSING APPARATUS

FIGS. 18, 19a, 19b, 20, and 21 illustrate a magnetic card processing apparatus that includes a unitary entry-printer unit 200 interconnected with a card processing unit 201 that has facilities for feeding unitary magnetic cards, such as card 202, while recording and reproducing data stored thereon. Card 202 is illustrated as having a plurality of data tracks in portion 202a and, as indicatd, each track may have associated justification data stored therein, as shown in portion 202b. The apparatus includes a control dial 204 for establishing a number of modes of operation similar to dial 17, FIG. 1. Dial 204 is contained on the front of control unit 205 that is placed in a convenient location accessible to the operator and so as not to interfere with operator activities. Printer 200 has a document 206 that is assumed to accommodate Side by Side column printed matter. Printer 200 has a single element print head 208 that is rotated and tilted for printing characters on document 206 and that moves adjacent document 206 during the printing of characters and spacing operations. A Tab operation tabs print head 208 from the left-hand column to the beginning of the right-hand column while a Carrier Return operation returns print head 208 to the left margin of document 206.

20

Figure 19A:
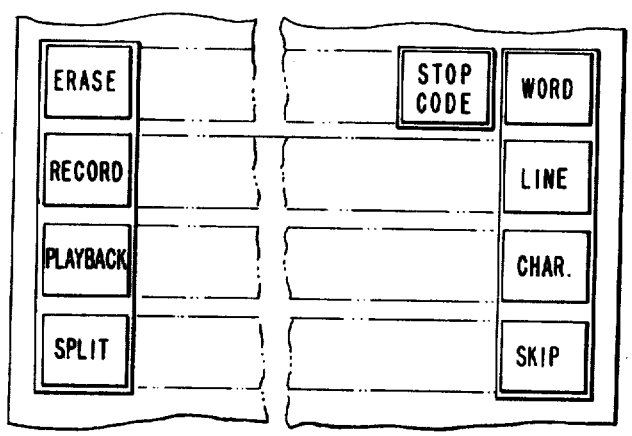
FIG. 19a illustrates a number of control buttons that may be incorporated on the keyboard of the entry-printing unit or on a separate control unit as in FIG. 1.

FIG. 19a illustrates a number of additional control keybuttons similar to those described in the 1965 Kolpek application. These are designated Erase, Record, Playback, Split, Stop Code, Word, Line, Character, and Skip. The modes of operation of the apparatus are similar to those described herein, and to the operations described in the 1965 Kolpek patent. Keyboard 210 on printer 200 would normally include additional buttons such as buttons 63–65, FIG. 1, when justification capabilities are provided in the equipment.

Figure 19B:
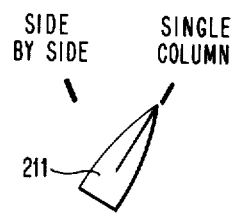
FIG. 19b shows a knob for selecting Side by Side Column justification or Single Column justification modes of operation.
Figure 20:
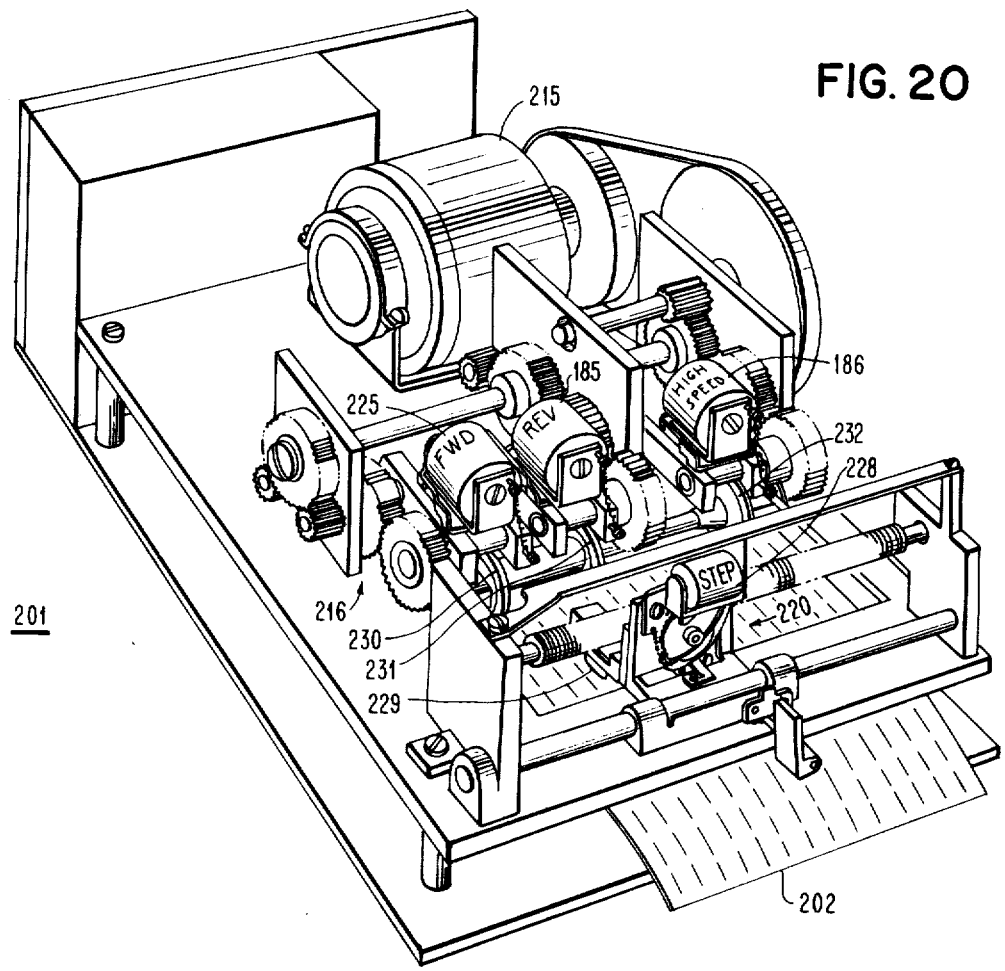
FIG. 20 is a detailed perspective view of the card processing apparatus of FIG. 18.
Figure 21:
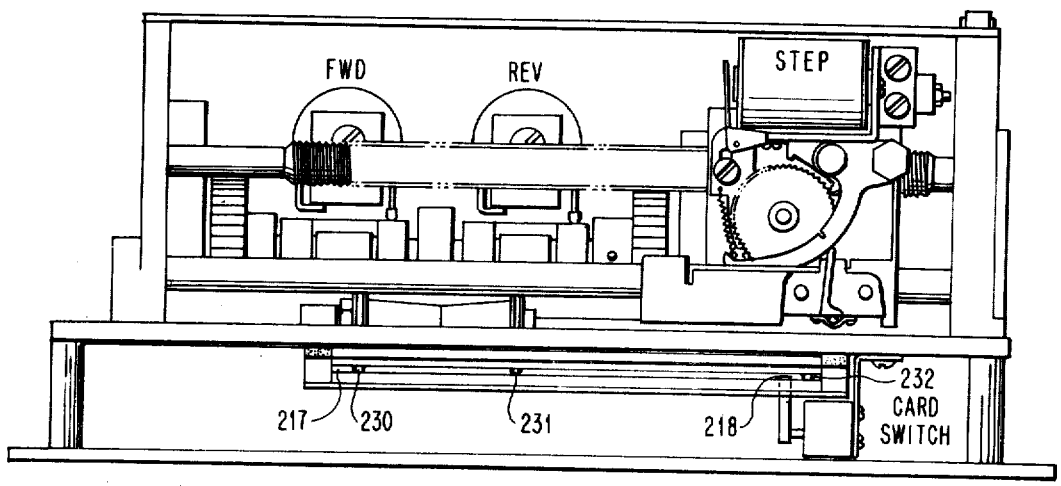
FIG. 21 is a front elevation of the card processing unit of FIGS. 18 and 20.

The selector dial 211, FIG. 19b, establishes either a Side by Side or a Single Column mode of justification when justification capabilities are in the equipment.

Since a magnetic belt media 11 is continuous in nature, scanning of the data stored on the media is also performed in a continuous manner around the periphery of the belt. A magnetic card media on the other hand, is non-continuous and modifications are required in order to record data on the card including justification data such as that stored in section 11a, FIG. 11.

The card processing system of FIGS. 18–21 is more particularly described in the 1967 Kolpek patent to which reference is specifically made for the details of operation, and particularly with respect to the feeding and stepping actions involved. The processing unit is designed to produce a movement of a record card, such as card 202, into position for recording of data in an initial track on the record card, to incrementally move the record card forward as recording of individual characters proceeds, and upon recognition of the end of the data for a particular line on document 206 to restore the card to the beginning of the next track by a high speed reversing action and concurrent stepping from the present track to the next track.

A brief summary of operation of the card processing unit is believed useful in connection with the various recording, reproducing, and justification arrangements described in the present application.

Processing unit 201 has a drive motor 215 arranged to drive a number of gear trains 216 and having Forward, Reverse, High Speed, and Step Magnets for controlling movement of a card and stepping from track-to- track.

Initially, a selected card is placed in a slot 217. A carrier assembly 220 carries a Step magnet 228 and a magnetic transducer 229 for recording and reproducing of signals. Normally, carrier 220 is positioned to the left in FIG. 20 in readiness to record or reproduce the first track of a card. When the Record button is depressed, forward magnet 225 is energized. Associated with forward magnet 225 is a roller 230 adapted for engagement with card 202. Roller 230 engages card 202 to feed it to an initial position determined by transfer of card lever 218.

When forward magnet 225 is energized, roller 230 is brought into contact with card 202 to advance it forward. As characters are entered from keyboard 210, forward magnet 225 continues to be energized in an incremental fashion to step card 202 a sufficient increment to accommodate each character entered.

Another head (not shown) having its own step magnet is provided to perform the Scan-Justify Table Lookup. A few changes are made to the Side by Side column justification circuit of FIG. 14 and the Single Column justification circuit of FIG. 16 in order to accommodate card processing.

SIDE BY SIDE COLUMN JUSTIFICATION

During side-by-side column justification procedures data is recorded in a track on card 202 and recognition of a Tab code at the end of the data in the left-hand column effects a Tab operation of printer 200 to the beginning of the right-hand column in the same line on document 206, and also initiates justification and Playback procedures in a manner similar to that described in connection with FIGS. 11 and 14.

In Side by Side column justification of FIG. 14, And circuit 180 is added. The Playback latch 124 output is routed by line 181 to forward clutch 91 rather than by line 98 as before. During recording, clutch 91 is actuated in an incremental fashion under control of the Character Record block 92, as before. During Playback, on the other hand, the Playback latch output through And circuit 180 is dependent upon a Not MRL input to terminal 182. This is available from the Media Reverse latch, FIG. 15. In a card environment, the sensing of time T4 at the end of the card sets the Media Reverse latch. The Media Reverse latch output (MRL) actuates a reverse clutch 185 and high speed clutch 186, FIG. 15, to effect a high speed reversal of movement of card 11 in order to reach the beginning of the tracks of data. With the Media Reverse latch set, the Not MRL input to And circuit 180 is down and forward clutch 91 is degated. The Media Reverse latch is reset upon recognition of the timing indication T1 that corresponds to the beginning of the record card. Thereupon, Not MRL rises, And circuit 180 becomes conditioned, and forward clutch 91 is operated to produce relative movement between card 11 and the heads 67 and 68 in order to derive previously recorded rough copy data or justification data, as appropriate.

It is apparent that the card processing unit is capable of a normal data recording and playback operation without justification procedures. In that event, operation of the apparatus is similar to a Single Column justification procedure, with the exception that a Carrier Return operation at the end of each line effects high speed relative return of transducer 229 and media 202 with concurrent stepping to the next track. In this case, no justification data is ordinarily stored on media 202.

SINGLE COLUMN JUSTIFICATION

The magnetic card processing unit is useful for Single Column justification, also. In this mode of operation, data is recorded in a particular track on media 202 until the end of the line in question. Upon recognition of a Carrier Return code at the end of the line, the scanning mechanisms previously described are operable to sense justification data and to record the data in association with the rough copy line just recorded. Subsequently, when all lines of a document are recorded on magnetic card 202, the card may be stored indefinitely or may be placed in the card processing apparatus 201 for a Playback operation. During the recording of tracks on media 202, step magnet 228 is operative at the end of the recording of the justification data to step the transducer 229 and carrier assembly 220 into cooperation with the next track on media 202. The operation during Playback is comparable to that in Record with the exception, of course, that signals are reproduced from media 202 and provided to printer 200 in order to produce justified printed lines. The scanning of tracks and stepping of transducer 229 is comparable.

Figure 15:
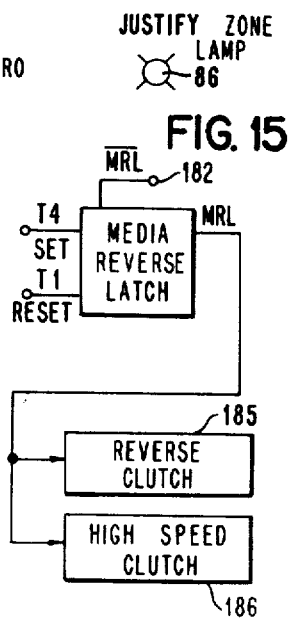
FIG. 15 illustrates additional circuitry for processing a unitary document, such as a magnetic record card.

The card processing unit 201 is admirably suited for normal power typewriting applications involving the typing of data, the storing of the data on media 202, and the later playback of the data with corrections, deletions, insertions, etc. In this event, the justification procedures are omitted and no justification data is recorded in association with the individual lines. In such an environment, the circuitry of FIG. 15 is modified so that upon recognition of the termination of a printed line and the corresponding recorded track on media 202, the high speed magnet 186 and reverse magnet 185 are operated directly and immediately to return media 202 to the beginning of the next track concurrently with a stepping operation by step magnet 228 in readiness for the recording of the data in the next track corresponding to the next printed line on document 206.

The general objective of the card processing apparatus 201 is to produce relative movement between a record media and the transducer in order to effect recording and reproducing of signals generally in parallel tracks, as well as an incremental displacement of the transducer in a step-by-step fashion to access any one of the individual tracks of information. It is evident that such relative movement and displacement may be performed by structures other than those illustrated. As an example, the magnetic media 202 may be retained in a stationary location and transducer 229 moved linearly along the individual tracks on media 202 to record and reproduce information. Upon completion of a line scan, transducer 229 is incremented into cooperation with the next track of information. As another alternative, media 202 may be retained in a generally stationary condition while scanning of individual lines is effected by transducer 229 to record and reproduce information and thereafter, media 202 is incremented in a step-by-step manner to effect relative displacement of transducer 229 and media 202 in order to establish cooperation of transducer 229 with the next track of information. In still another alternative, it may be desirable to establish scanning of transducer 229 along a first track in one direction on media 202 and to effect scanning along the next succeeding track in the opposite direction along media 202, with incremental stepping between tracks. The foregoing, in effect, results in alternately opposite recorded tracks on media 202. A suitable transducer driving arrangement of this nature is fully disclosed in the Dollenmayer application noted in the reference section.

A number of other alternative techniques may be used. It may be appropriate under some circumstances to make use of only a single line or track on the record media 11 and to degate the stepping of the magnetic recording and reproducing head 67. In this event, a single line of rough copy data is recorded in the track selected with or without justification data, depending upon the mode of operation of the equipment. Upon termination of the Playback mode involving the line of data just recorded, a new line of rough copy data is recorded in the same track with erasure of the previous data.

With the foregoing arrangement, it may be possible in one mode to record only a single line of rough copy data in a predetermined track on the media with each successive line being recorded in the same track, and it is also possible to record a multiplicity of lines, each in its own individual track and each having its own justification data, as in a Single Column justification mode. It is also possible to have both a Side by Side justification mode and a Single Column justification mode in the same apparatus by suitable switching of the circuits. This entails the combining of the additional circuitry shown n FIG. 16 with the basic circuitry of FIG. 14 and the incorporation of relay switching, or other switching, to change from one kind of justification mode to the other.

The apparatus is adaptable to handle other composition functions, such as centering and flush right, or flush left-flush right combinations. Suitable switching is provided to establish the desired composing operation. The media has a plurality of prerecorded tables that are independently selected depending on the composition mode. These tables have values other than those described. As an example, in centering a line of text with a line remainder of "17," factors are stored to divide the 17 by a factor of "2" to initiate space operations prior to printing and establish balanced white space on the left and right ends of the line.

EDITING AND LINE REVISION CAPABILITIES

The editing facilities provided in the 1965 Kolpek patent and the Locklar et al. Pat. 3,260,340 are equally applicable to the various embodiments disclosed herein, including the magnetic belt embodiment and the magnetic card embodiment. The Locklar et al. patent teaches the provision of facilities for playing back or skipping convenient size categories of information, such as words, lines, and characters as controlled by the operator in order to simplify revision procedures. The editing and recognition of categories in the Locklar patent occurs generally in the forward direction as information is reproduced from a magnetic media. The 1965 Kolpek patent teaches the provision of additional editing capabilities for reversely scanning categories of information such as words, lines, and characters in order that they may be deleted concurrently with a recording operation. The Locklar et al. patent also describes a line revision arrangement for use with an elongated magnetic record media. Upon recognition of a Carrier Return code during original entry and recording of information on the media, an extra Feed code is recorded along with the Carrier Return code and is thereafter available to permit expansion of an individual line by one character. Additional Feed codes may be recorded if desired. In the present case, since each line of a document has an associated track on the record media (whether belt or card) that is chosen to accommodate the maximum number of characters that may be expected for individual lines on the document, additional space for line revision is inherently provided in the system. As an example, if each track on the belt or card media is capable of accommodating 200 characters and the average line is only 150 characters in length, an additional 50 character positions is available, on the average, to expand each individual line. Naturally, except in the case of justified lines, each line will vary considerably from the average. Accordingly, the correlated line-for-line and track-for-track arrangement disclosed herein provides a considerable advantage in recording, processing, and revision of data in a system of this nature.

LINE READJUST

The Sims patent teaches a Line Readjust technique that is also useful in connection with the systems described herein. The Line Readjust capabilities contemplate the recording of data on the media according to a first predetermined format established by left and right margin settings with Space codes and Carrier Return codes recorded as they occur during typing. Subsequently, if the margin limits are set to the same settings as when the data was originally recorded, the lines printed during Playback will correspond in length and the data read from the media is interpreted as recorded.

Under some circumstances, however, it may be desirable to change the data format by shortening or lengthening the lines on the document while still making use of the data originally recorded on the media. In a line Readjust mode of operation, the interpretation of characters stored on the media during Playback is dependent upon whether they occur in a first portion of each line or in an end portion termed the "Zone" or "Region." Carrier Return codes occurring in the Region effect a Carrier Return operation, while Carrier Return codes occurring in the first part of a line are converted to Space operations. Conversely, Space codes occurring in the line ending Region area are converted to Carrier Return codes, but are interpreted normally outside the Region. Irrespective of the Return action of the printer, the transduced is relatively displaced to a new track on the media, only upon actual recognition of at least one Return code in the track being sensed. Specific reference is made to the Sims Pat. 3,297,124 for the various modes of operation, including the Line Readjust mode.

TRANSFER AND TRANSFER ADJUST MODES

Figure 18:
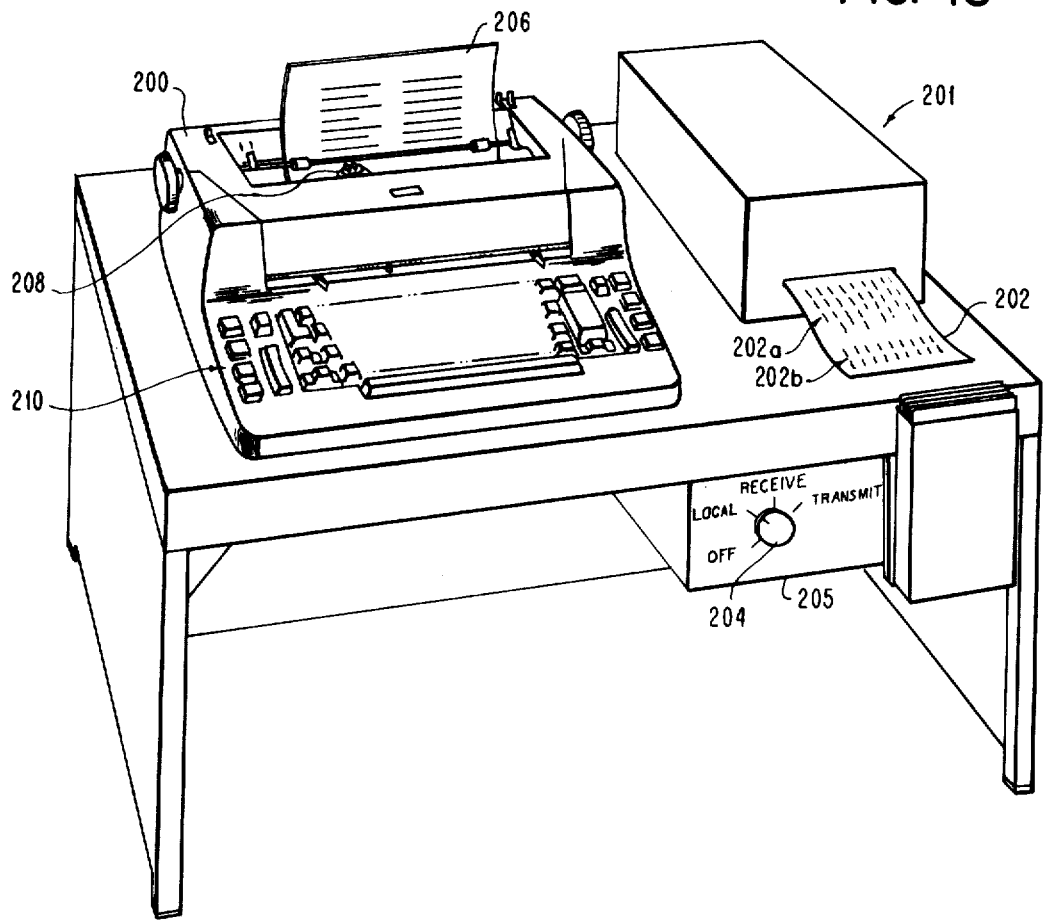
FIG. 18 shows a combined operator entry-printing unit in association with apparatus for processing individual unitary magnetic record cards. The operator unit may take the form of the composer unit in FIG. 1.

Other types of operations described in the Sims patent that are of interest in connection with the systems described herein are the Transfer Type operation and the Transfer Adjust operation. In either of the operations, the systems of FIGS. 1 and 18 are provided with additional recording units. In the case of FIG. 1, the system is provided with an additional magnetic belt recording and reproducing unit interconnected with printer 1 and recording/reproducing unit 2. In the case of FIG. 18, an additional card processing unit is interconnected with printer 200 and card processing unit 201.

At times it becomes desirable to transfer information from one unit to the other. In a Transfer Type mode, the information on one of the processing units is transferred to the other processing unit with concurrent printing of a document and no line readjustment. In a Transfer Adjust mode of operation, the information of one of the processing units is transferred to the other unit exactly in the same manner as encountered but the printing of a document takes place under the Line Readjustment requirements that were previously discussed.

In some cases, it is desirable that printing of a document takes place under control of either of the units with some information being derived from one unit and other information from the other unit. The provision of a Switch code in the recorded data and appropriate circuits as described in the Sims case enable the switching back and forth between the units during the playback of information.

COMMUNICATION FACILITIES

Reference is made to the 1965 Kolpek patent for communication techniques that are useful in the belt or card systems described herein. Kolpek provides data subsets in his system. It is assumed herein that digital data is supplied directly by printer 1, or from unit 2 as a result of a previous recording operation. To transmit information from the one station shown herein in FIG. 1 to another station 46, the one station calls the other through the subsets. Knob 17 is set to a Transmit position and a similar knob at station 46 is set to a Receive position. Similar procedures are followed for the card embodiment of FIGS. 18–21.

It is assumed that six bit characters are used in the communications network rather than the seven or eight bit characters previously indicated. During transmision of information with six bit characters, the characters are transferred from printer 1, as an example, or unit 2, to a data register in control unit 3, FIG. 1. The coresponding elements in FIG. 18 are printer 200, recorder unit 201, and control unit 205. In the belt embodiment of FIG. 1, characters are supplied by transmission lines 20 and 21 to station 46. The card embodiment of FIG. 18 is interconnected with a station like station 46. To illustrate the transmission process, it is assumed that the individual characters comprise two sets of pulses of three bits each. A number of pulses that is the decimal equivalent of the coded configuration is transmitted instead of the actual bit configuration of the character in a manner somewhat comparable to that used in the local recording and playback operation.

Each character transmitted over lines 20 and 21, therefore, consists of a first series of pulses and a second series of pulses separated by a short time interval. Longer time intervals separate the individual character pulse sets. Other character configurations may be transmitted.

Transmission and receipt of a typical character is set forth in the table below.

|  | Serialize | Pulses transmitted and Received | | | | | | Deserialize |
|---|---|---|---|---|---|---|---|---|
| A. Character, Entered | 100 001 | | | | | | | 111 111 |
| B. Transmit, First Three Bit Group: | | | | | | | | |
| MV pulse | 010 001 | 1 | | | | | | 000 111 |
| Do | 110 001 | | 1 | | | | | 100 111 |
| Do | 001 001 | | | 1 | | | | 010 111 |
| Do | 101 001 | | | | 1 | | | 110 111 |
| Do | 011 001 | | | | | 1 | | 001 111 |
| Do | 111 001 | | | | | | 1 | 101 111 |
| Do | 000 001 | | | | | | | 1 | 011 111 |
| C. Transmit, Second Three Bit Group: | | | | | | | | |
| MV pulse | 000 101 | 1 | | | | | | 011 000 |
| Do | 000 011 | | 1 | | | | | 011 100 |
| Do | 000 111 | | | 1 | | | | 011 010 |
| Do | 000 000 | | | | 1 | | | 011 110 |
| | | | | | | | | 100 001 |
| D. Invert, Received Character for Typing or Recording | | | | | | | | |

In the manner illustrated, the original character entered is transmitted for utilization by station 46. Reference is again made to the 1965 Kolpek case for detailed serializing and deserializing procedures.

The operation of station 46, if it includes a printer and recorder, occurs in a manner comparible to the stations illustrated in FIGS. 1 and 18 herein. Thus, with a similar recorder hardware, relative movement and relative displacement of transducer and media occurs in a synchronous fashion to produce a correlated line-for-line or track-for-track transmission of data.

As described, the transmitted data may include justification data. Station 46 may respond to the data signals directly to produce justified copy, if only a printer is provided. Or, station 46 may simply record all the data on a record media if a recording unit is provided, for subsequent production of justified copy by a printing means during a reproducing operation. Also, the justification data may be developed at the receiving end during transmission of rough copy data by telecommunications facilities.

The receiving station may record or store rough copy data and justification data (as in a buffer unit) or rough copy data alone, either ignoring the justification data, directing it to another storage facility or directly to a printer in order to set up the printer for operation during a subsequent reproduction of the rough copy data.

In addition, the correlation action driving Local or Telecommunication modes may be dependent upon recognition of line ending return signals or upon recognition of the justification data associated with each new line, especially when such justification data is stored in a separate facility but still associated with the data in the recorded tracks. A sequence might then be: access track A justification data, reproduce data track A, recognize CR code, access track B justification data, step to track B, reproduce data track B, etc.

Transmission of data from station 46 to the stations shown can be handled in a comparable fashion by reversing the settings of the mode control knobs.

It may be desirable to provide mechanisms and circuits for Document Return Control in order to relatively and automatically position a media to the beginning of the first track for recording or reproducing purposes. Thus, considering the operations previously discussed, such Return Control means is operative immediately upon depression of the associated mode control button to establish a first track position on the card.

While the invention has been particularly shown and described with reference to a number of embodiments, it will be understood by those skilled in the art that various changes in form and detail may be made without departing from the spirit and scope of the invention.

What is claimed is:

1. Correlated data processing apparatus, comprising:
a source of data signals representative of informational and function characters arranged in individual categories, such as lines of information, each of said lines comprising a succession of character signal sets numbering up to a predetermined maximum number but normally numbering a variable quantity less than said maximum number;
normally stationary storage means for storing said data signals, said storage means including a plurality of predefined individual category storage areas, each having a character set storage capacity up to said predetermined maximum number of character signal sets and each storage area being available for storage of a category of information;
means for initially positioning a particular one of said storage areas with the first character set location in readiness for storage of a first character set of information from said data source;
moving means activated as each character is provided from said source for relatively moving said normally stationary storage means at least an increment corresponding to a character set location;
transducer means activated during each said movement of said storage means to record the related character set signals from said source in said selected area, with the successive character sets being recorded in successive character set locations in said area; and
correlating means operative during operations for recognizing the last character set of each said category of information from said data source, and means in said correlating means for thereupon selecting and positioning another category storage area in said storage means for recording character sets of the next one of said categories, said each last character set normally occurring prior to reaching the last character set location in said storage area, thereby normally and inherently providing unused character set locations in each of said storage areas that are available for expansion of said individual categories of information stored in said storage means.

2. The apparatus of claim 1, wherein:
said data source comprises printing means that supplies data signals concurrently with the printing of characters, and further comprises keyboard entry, means including means for generating character set signals representative of character keys, and functional keys, such as a Return Key; and wherein
said correlating means includes means responsive to a Return signal to select a new category storage area.

3. The apparatus of claim 1, further comprising:
means operative in a reproducing operation for reproducing signals from said normally stationary storage means.

4. The apparatus of claim 3, further comprising:
a keyboard for entry of characters and selection of functions;
a printer, said printer supplying signals representative of data arranged in a plurality of printed lines on a document, with each data line being stored in an associated storage track on said media; and
means in said correlating means for recognizing return of said printer to a left margin on a document to select a new storage track on said media for a succeeding line.

5. The apparatus of claim 3, wherein:
said media is a continuous magnetic belt; and further comprising
means for moving said magnetic belt normally in a particular direction to access individual tracks thereon for recording and reproducing information.

6. The apparatus of claim 3, wherein:
said correlating means includes means to select another storage area upon recognition of the last character set of a category as indicated by said source during the recording of information, and further includes means to select another storage area when a last character set indication is recognized in an individual storage track during the reproduction of information.

7. The apparatus of claim 6, wherein:
said source comprises a printer that includes means to supply Return signals indicative of the termination of printed lines of information, and means responsive to said Return signals to record said Return signals as the last character set in the data area associated with the line being terminated; and wherein
said correlation means includes means responsive during a recording operation to a Return signal from said source and further responsive during a reproducing operation to a Return signal recognized in a data area to perform the selection function in order to access another area on said storage means.

8. Data processing apparatus, comprising:

a keyboard entry source of data signals representative of informational and functional characters arranged in individual categories, such as lines of information, each of said lines comprising a succession of character signal sets numbering up to a predetermined maximum number but normally numbering a variable quantity less than said maximum number;

magnetic storage means including facilities to establish a recording operation for recording the information represented by said data signals in a normally stationary magnetic record media having side by side category storage areas, each with at least a capacity sufficient to store said maximum number of character sets in a line of information;

moving means activated as each character set is provided from said source for relatively moving said normally stationary storage means at least an increment corresponding to a character set location;

means for initially positioning a particular one of said storage areas with the first character set location in readiness for storage of a first character set of information from said data source;

transducer means activated during each said movement of said storage means to record the related character set signals from said source in said selected area with the successive character sets being recorded in successive character set locations in said area;

correlating means operative during said storing operations for recognizing the last character set of each said category of information from said data source, and means in said correlating means for thereupon selecting and positioning another category storage area in said storage means for recording character sets of the next one of said categories, said each last character set normally occurring prior to reaching the last character set location in said storage area, thereby normally and inherently providing unused character set locations in each of said storage areas that are available for expansion of said individual categories of information stored in said storage means;

said magnetic storage means further including facilities to establish a reproducing operation for reproducing information stored in said storage areas; and an output means, such as a printer, associated with said keyboard entry means and responsive to data signals supplied during a reproducing operation to produce an output media.

9. The apparatus of claim 8, further comprising:

composing means responsive to original entry of rough copy data from said keyboard source to provide signals representative of the justification requirements of a line of information; and means responsive to the justification signals from said composing means and to the informational signals from said magnetic storage means during a reproduce mode of operation for controlling said output means to produce justified copy.

10. The apparatus of claim 9, further comprising:

mode control means for conducting a variety of composing operations, including Side by Side column justification, Single Column justification, Centering, Flush Right, Flush Left, and combinations of the foregoing.

11. The apparatus of claim 9, further comprising:

means in said magnetic storage means responsive to justification signals from said composing means for recording the same in association with line categories stored in said storage means.

12. The apparatus of claim 11, further comprising:

mode control means including first means for establishing a Local mode of operation wherein rough copy data is entered and recorded on said magnetic storage means for subsequent reproduction under control of said composing means to produce justified copy; and second means for establishing another mode of operation wherein data signals on said storage means are reproduced and transmitted by telecommunication facilities to a utilization device.

13. The apparatus of claim 11, wherein:

said storage means includes means for recognizing justification signals for an individual line prior to the reproduction of the data signals for that line for subsequent use in justifying said individual line.

14. The apparatus of claim 13, wherein:

said storage unit includes means to recognize justification information and character information in each of said storage areas in succession and to supply the same to said printing means for the production of justified copy.

15. The apparatus of claim 8, further comprising:

mode means operative in one mode to reproduce a plurality of tracks of data for printing a plurality of lines of information, and in another mode to reproduce an individual track to print a single line of data;

an operator selection means for establishing either one of said modes, as required.

16. The apparatus of claim 15, further comprising:

mode control means including first means for establishing a Side by Side column justification mode of operation for producing printed rough copy in a left-hand column on a document and concurrently recording on said media, determining justification factors and reproducing said rough copy data from said media in order to produce justified copy in a right-hand column on said document; and second means for establishing another mode of operation designated Single Column justification for producing rough copy data and associated justification information for recording on said media for a plurality of lines of information on a document, each occupying an individual track on said storage means.

17. The apparatus of claim 16, wherein:

said mode control means includes means further operative in a Single Column mode to reproduce said plurality of data tracks and associated justification information for producing justified copy during a subsequent operation.

18. The apparatus of claim 8, further comprising:

mode control means for establishing an intermix operation; and means included in said output means controlled by said intermix means and responsive to signals from said keyboard and to signals from said storage means to produce an output media.

19. The apparatus of claim 8, wherein:

said magnetic media is a continuous magnetic record belt; and further comprising means operative to move said magnetic belt normally in a particular direction in order to scan individual tracks for recording and reproduction of information.

20. The apparatus of claim 8, further comprising:

means for activating said apparatus in a sequence of operations to Read and Record a first category, Read and Record a succeeding category, etc.

21. The apparatus of claim 8, further comprising:

format means for supplying category control criteria relative to a restore home left margin limit, a right margin limit in said output means and of printed line lengths that may differ during recording and reproducing operations;

means operative during reproduction of data signals including first means for establishing a normal Playback mode wherein data signals are supplied from said storage means to said output device and responded to by said output device as originally recorded, and including second means for establishing a Line Readjust mode wherein response of said output device is determined by said format means.

22. The apparatus of claim 21, further comprising:

an additional storage means with facilities comparable to those recited and having Side by Side category areas, and mode control means including first means for establishing a Transfer mode to reproduce data signals in said one storage means, supply said signals to said additional storage means for recording and concurrently to said output means for printing as originally recorded; and second means for establishing a Transfer Adjust mode to process data as in a Transfer mode but wherein the response of said output means to said data signals is determined by said format means as in a Line Readjust mode.

23. The apparatus of claim 21, wherein:

means are provided for deriving line ending indications during a Playback mode or a Line Readjust mode, and further comprising selection means including first means operative upon recognition of a line ending indication to restore said output means to said left margin and second means to select a new category storage area on said media if the end of category coincides with the derived line ending condition.

24. The apparatus of claim 23, further comprising:

means in said format means for establishing a line ending Region;

means for recognizing Space codes and Return codes in the Region to initiate a Return operation to said left margin when in a Line Readjust mode, and Space codes and Return codes outside the Region to initiate a Space operation of said output printer means; and means in said selection means operative to select a new category on said media only upon recognition of at least one Return code on said media irrespective of the Return action of said output means.

25. The apparatus of claim 8, further comprising:

an additional storage means including recording and reproducing facilities, and having Side by Side category storage areas, and mode control means including means for establishing a Transfer mode of operation for reproducing data signals in said one storage means and supplying said signals to said additional storage means for recording.

26. Apparatus for recording data signals in conjunction with a magnetic card record media, comprising:

a source of data signals representative of informational and functional characters arranged in categories, such as lines of information, each of said lines comprising a succession of character signal sets numbering up to a predetermined maximum number but normally numbering a variable quantity less than said maximum number;

means for processing a magnetic record card media, said card media having a plurality of linear storage tracks for storing individual data categories, each having a character set storage capacity up to said predetermined maximum number of character set signals and each storage track being available for storage of a category of information;

means activated as each character set is provided from said source for rectilinearly and relatively moving said record card media and said recording means linearly at least an increment corresponding to a character set location to record data signals in a selected track on said card media;

means for initially positioning a particular one of said storage tracks with the first character set location in readiness for storage of a first character set of information from said data source;

transducer means activated during each said movement of said storage means in a recording operation to record the related character set signals from said source in said selected track with the successive character sets being recorded in successive character set locations in said track;

and correlating means operative during said storing operations for recognizing the last character set of each said category of information from said data source, and means in said correlating means for thereupon selecting and positioning another linear category storage track in said card media for recording character sets in the next one of said categories, said last character set normally occurring prior to reaching the last character set location in a said storage track, thereby normally and inherently providing unused character set locations in each of said linear storage tracks that are available for expansion of said individual categories of information stored in said magnetic card media.

27. The apparatus of claim 26, further comprising:

means associated with said card processing means for reproducing previously recorded data signals on a magnetic card media; and means operative during a reproducing operation for moving and displacing said record media as in a Record operation.

28. The apparatus of claim 27, further comprising:

means controlled by an operator for selecting desired categories of information for editing purposes, such as lines, words, and characters.

29. The apparatus of claim 27, further comprising:

a combined keyboard-printer unit; and wherein said data source includes means for supplying character signals in response to depression of informational and functional keys on said keyboard for recording on said magnetic card media; and means responsive to character signals derived during reproducing operations to operate said printer in order to produce printed copy.

30. The apparatus of claim 27, further comprising:

document return control means for controlling said means for initially positioning said particular track on said media automatically at the start of a recording or reproducing operation.

31. The apparatus of claim 27, further comprising:

means operative during a recording operation to generate justification data associated with said individual categories; and means responsive to said justification data to produce justified printed copy during a reproducing operation.

32. The apparatus of claim 31, further comprising:

means to record justification data on said card media in association with said individual categories.

33. The apparatus of claim 31, further comprising:

telecommunication facilities; and means for establishing telecommunication operations during which data, including said justification data is transmitted via said telecommunication facilities.

34. Apparatus for transducing data signals in conjunction with a magnetic card record media, comprising:

means for processing a normally stationary magnetic record card media, said card media having a plurality of linear storage areas each having a character set storage capacity up to a predetermined maximum number of character set signal and each storage area being available for storage of a category of information such as lines of information, each of said lines comprising a succession of character signal sets numbering up to said predetermined maximum number but normally numbering a variable quantity less than said maximum number;

transducing means;

means activated as each character set occurs in a transducing operation for rectilinearly and relatively moving said record card media and said transducing means linearly at least an increment corresponding to a character set location to develop data signals in relation to a selected track on said card;

and correlating means operative during said transducing operations for recognizing the last character set of each said category of information and means in said correlating means for thereupon selecting and positioning another category storage area by relatively displacing said card media for transducing character sets in the next one of said categories, said each last character set normally occurring prior to reaching the last character set location in said storage area, thereby normally and inherently providing unused character set locations in each of said storage areas that are available for expansion of said individual categories of information stored in said card media.

35. The apparatus of claim 34, comprising:
means actuated during said transducing operation to record data signals in said storage areas.

36. The apparatus of claim 34, further comprising:
means activated during said transducing operation to reproduce data signals from said storage areas.

37. The apparatus of claim 34, further comprising:
means activated during said transducing operation to record data signals in said storage areas in one mode of operation and to reproduce data signals from said storage areas in another mode of operation.

38. The apparatus of claim 37, further comprising:
means operative during a recording operation for producing justification signals for individual categories of information;

means for retaining said justification signals for association with individual categories;

and means operative during a reproducing operation for selecting a new category storage area upon recognition of the justification data associated with said new category.

39. The apparatus of claim 42, further comprising:
an additional magnetic card processing unit responsive to signals transmitted by said telecommunication facilities to produce a magnetic record card.

40. The apparatus of claim 39, further comprising:
an additional card processing unit including rectilinear movement and relative displacement means, and means for coordinating the operation of said movement and displacement means in both said units in a synchronized fashion during telecommunication operations.

41. The apparatus of claim 40, further comprising:
means in said coordinating means responsive to Line Return code signals to maintain synchronism.

42. The apparatus of claim 37, further comprising:
telecommunication facilities, including means for establishing operations during which data is reproduced from said record card media and transmitted to a distant station.

43. The apparatus of claim 42, further comprising:
a buffer storage unit at a receiving station for storing transmitted data signals.

44. The apparatus of claim 42, further comprising:
means operable during telecommunications operations to generate justification data associated with received rough copy individual categories.

45. The apparatus of claim 44, further comprising:
a printer; and means associated with said printer and responsive to received justification data for controlling operation of said printer to produce justified copy.

46. The apparatus of claim 44, further comprising:
means for storing said generated justification data; and means responsive to stored justification data to produce justified printed copy.

47. The apparatus of claim 44, further comprising:
an additional magnetic card processing unit responsive to signals transmitted by said telecommunication facilities, including said justification data signals, for producing an additional magnetic record card.

48. The apparatus of claim 47, further comprising:
separate means for utilizing said justification data signals, and means in said additional unit for recording only said rough copy data signals on said additional magnetic record card.

49. The apparatus of claim 47, further comprising:
means in both said card processing units for rectilinearly moving and relative displacing said media, and means in said coordinating means for recognizing the justification data associated with each category to maintain synchronism as to transmitted categories, such as lines.

References Cited

UNITED STATES PATENTS

| | | | |
|---|---|---|---|
| 3,167,003 | 1/1965 | Taylor et al. | 340—172.5 |
| 3,205,996 | 9/1965 | Greenwood | 197—84 |
| 3,260,340 | 7/1966 | Locklar et al. | 197—20 X |
| 3,297,124 | 1/1967 | Sims | 197—19 |
| 3,297,992 | 1/1967 | McDonald et al. | 340—172.5 |
| 3,310,780 | 3/1967 | Gilley et al. | 340—172.5 |
| 3,376,549 | 4/1968 | Ford | 340—172.5 |
| 3,417,202 | 12/1968 | Kol Pek | 178—31 |

PAUL J. HENON, Primary Examiner

P. R. WOODS, Assistant Examiner

U.S. Cl. X.R.

197—84